US009927190B2

(12) United States Patent
Liberman

(10) Patent No.: US 9,927,190 B2
(45) Date of Patent: Mar. 27, 2018

(54) METHOD OF CONTROLLING A CHILLER

(71) Applicant: Lncon Systems Ltd., Tel Mond (IL)

(72) Inventor: Izidor Liberman, Tel Mond (IL)

(73) Assignee: Lacon Systems Ltd., Ashkelon (IL)

( * ) Notice: Subject to any disclaimer, the term of this patent is extended or adjusted under 35 U.S.C. 154(b) by 344 days.

(21) Appl. No.: 14/366,272

(22) PCT Filed: Jan. 6, 2013

(86) PCT No.: PCT/IL2013/050018
§ 371 (c)(1),
(2) Date: Jun. 18, 2014

(87) PCT Pub. No.: WO2013/105087
PCT Pub. Date: Jul. 18, 2013

(65) Prior Publication Data
US 2014/0332195 A1    Nov. 13, 2014

Related U.S. Application Data

(60) Provisional application No. 61/585,679, filed on Jan. 12, 2012.

(51) Int. Cl.
| | |
|---|---|
| *F25D 17/02* | (2006.01) |
| *F28F 27/00* | (2006.01) |
| *G05D 23/19* | (2006.01) |
| *G05B 13/04* | (2006.01) |
| *F24F 11/00* | (2018.01) |

(52) U.S. Cl.
CPC .............. *F28F 27/00* (2013.01); *F24F 11/00* (2013.01); *G05B 13/048* (2013.01); *G05D 23/1917* (2013.01); *F24F 2011/0075* (2013.01); *F24F 2011/0091* (2013.01); *G05B 2219/2614* (2013.01); *G05B 2219/49068* (2013.01)

(58) Field of Classification Search
CPC .... F28F 27/00; F24F 11/00; F24F 2011/0075; F24F 2011/0091; G05B 13/04; G05B 2219/2614; G05B 2219/49068; G05D 23/1917
See application file for complete search history.

(56) References Cited

U.S. PATENT DOCUMENTS

| | | | | |
|---|---|---|---|---|
| 5,058,388 | A * | 10/1991 | Shaw ...................... | F24F 3/044 62/176.6 |
| 6,085,532 | A * | 7/2000 | Sibik ...................... | F25B 49/02 62/177 |
| 8,251,297 | B2 * | 8/2012 | Pouchak .................. | F23N 5/00 122/448.1 |
| 9,222,712 | B1 * | 12/2015 | Zugibe .................... | F25B 49/02 |
| 9,348,392 | B2 * | 5/2016 | Drees ..................... | G05B 15/02 |

(Continued)

*Primary Examiner* — Ljiljana Ciric
(74) *Attorney, Agent, or Firm* — Pearl Cohen Zedek Latzer Baratz LLP

(57) ABSTRACT

A method of controlling a chiller is disclosed. The method includes predicting, by a controller, a quantity of energy used by a chiller, based on a predicted flow of heat into one or more rooms in a building, to maintain a temperature of the one or more rooms in a building at a desired temperature during each of a first plurality of time periods of a chilling cycle. The predicted flow of heat is calculated using a predicted condition. A set point of the chiller is automatically adjusted during the chilling cycle using the predicted quantity of energy.

14 Claims, 10 Drawing Sheets

(56) References Cited

U.S. PATENT DOCUMENTS

| | | | |
|---|---|---|---|
| 9,366,451 B2* | 6/2016 | Guo | F24F 11/0009 |
| 9,612,601 B2* | 4/2017 | Beyhaghi | G05D 23/1917 |
| 9,784,464 B2* | 10/2017 | Yamamoto | F24F 11/00 |
| 9,785,126 B2* | 10/2017 | Kaufman | G05B 13/048 |
| 9,798,336 B2* | 10/2017 | Przybylski | G05D 23/1917 |
| 2002/0033391 A1* | 3/2002 | Malinoski | G01R 31/2874 |
| | | | 219/494 |
| 2006/0036349 A1* | 2/2006 | Kates | F25B 49/005 |
| | | | 700/276 |
| 2007/0005191 A1 | 1/2007 | Sloup et al. | |
| 2008/0109100 A1* | 5/2008 | Macharia | C10L 1/02 |
| | | | 700/110 |
| 2008/0210089 A1* | 9/2008 | Tsangaris | C10J 3/00 |
| | | | 95/90 |
| 2008/0277486 A1* | 11/2008 | Seem | F24F 11/0009 |
| | | | 236/49.3 |
| 2011/0061015 A1* | 3/2011 | Drees | G05B 15/02 |
| | | | 715/771 |
| 2011/0184565 A1 | 7/2011 | Peterson | |
| 2011/0197601 A1 | 8/2011 | Booth et al. | |
| 2011/0257911 A1* | 10/2011 | Drees | G05B 15/02 |
| | | | 702/61 |
| 2012/0022700 A1* | 1/2012 | Drees | G05B 15/02 |
| | | | 700/276 |
| 2012/0084063 A1* | 4/2012 | Drees | G06Q 10/06 |
| | | | 703/6 |
| 2012/0227926 A1* | 9/2012 | Field | F24D 11/003 |
| | | | 165/10 |
| 2013/0085614 A1* | 4/2013 | Wenzel | F24F 11/006 |
| | | | 700/277 |
| 2013/0085616 A1* | 4/2013 | Wenzel | G05F 1/66 |
| | | | 700/278 |
| 2013/0325377 A1* | 12/2013 | Drees | G06Q 10/06 |
| | | | 702/61 |
| 2014/0048244 A1* | 2/2014 | Wallace | F28F 27/00 |
| | | | 165/253 |
| 2014/0208752 A1* | 7/2014 | Palanisamy | F01K 3/004 |
| | | | 60/648 |
| 2014/0330695 A1* | 11/2014 | Steven | G06Q 30/0283 |
| | | | 705/37 |
| 2014/0332195 A1* | 11/2014 | Liberman | G05D 23/1917 |
| | | | 165/267 |
| 2014/0350738 A1* | 11/2014 | Angerame | G05B 13/04 |
| | | | 700/291 |
| 2014/0371920 A1* | 12/2014 | Varadi | G06Q 10/04 |
| | | | 700/276 |
| 2015/0057810 A1* | 2/2015 | Smith | F24F 11/001 |
| | | | 700/276 |
| 2015/0178865 A1* | 6/2015 | Anderson | G05B 17/02 |
| | | | 705/7.25 |
| 2015/0227870 A1* | 8/2015 | Noboa | G06Q 10/0635 |
| | | | 705/7.28 |
| 2015/0253027 A1* | 9/2015 | Lu | F24F 11/006 |
| | | | 700/276 |
| 2015/0316946 A1* | 11/2015 | Wenzel | G06Q 10/04 |
| | | | 700/291 |
| 2016/0356243 A1* | 12/2016 | Curtis | F02D 25/00 |
| 2016/0377306 A1* | 12/2016 | Drees | F24F 11/006 |
| | | | 700/295 |
| 2017/0089600 A1* | 3/2017 | Smith | F24F 11/006 |
| 2017/0102162 A1* | 4/2017 | Drees | F24F 11/0086 |
| 2017/0102433 A1* | 4/2017 | Wenzel | G01R 31/3651 |
| 2017/0102434 A1* | 4/2017 | Wenzel | G01R 31/3651 |
| 2017/0102675 A1* | 4/2017 | Drees | G05B 13/0205 |
| 2017/0103483 A1* | 4/2017 | Drees | G06Q 50/16 |
| 2017/0104332 A1* | 4/2017 | Wenzel | H02J 3/32 |
| 2017/0104336 A1* | 4/2017 | Elbsat | H02J 3/383 |
| 2017/0104337 A1* | 4/2017 | Drees | H02J 3/385 |
| 2017/0104342 A1* | 4/2017 | Elbsat | H02J 7/007 |
| 2017/0104343 A1* | 4/2017 | Elbsat | H02J 7/007 |
| 2017/0104344 A1* | 4/2017 | Wenzel | H02J 3/383 |
| 2017/0104345 A1* | 4/2017 | Wenzel | H02J 7/007 |
| 2017/0104346 A1* | 4/2017 | Wenzel | H02J 7/007 |
| 2017/0115650 A1* | 4/2017 | Holleran | G05B 19/048 |

* cited by examiner

METHOD OF CONTROLLING A CHILLER

CROSS-REFERENCE TO RELATED APPLICATIONS

This application is a National Phase Application of PCT International Application No. PCT/IL2013/050018, International Filing Date Jan. 6, 2013, claiming priority of U.S. Provisional Patent Application No. 61/585,679, filed Jan. 12, 2012, both of which are hereby incorporated by reference.

FIELD OF THE INVENTION

The present invention relates to control of operation of a chiller.

BACKGROUND OF THE INVENTION

A large heating, ventilation and air conditioning system (HVACS) for a building or other structure may use a chiller to cool or heat water that is used to cool or heat rooms of the building. The chilled or heated water may be caused to flow through coils in a room of the building. Air in the room may be caused to flow through the coils. The coils serve as heat exchangers to enable cooling or heating of the air. Chillers and rooms may have separate control systems. Thus, a thermostat in a room may control or trigger the flow of air through the coils, but not affect operation of the chiller. A separate thermostat or management system may control a set point that determines the temperature to which the water is cooled or heated.

Energy usage of an HVACS may vary according to the square of the difference between the ambient outdoor temperature and the set point temperature of the chiller.

SUMMARY OF THE INVENTION

Thus, there is provided, in accordance with some embodiments of the present invention, a method that includes: predicting, using a predicted flow of heat into an area, a quantity of energy used by a chiller to maintain a desired temperature of the area during each of a plurality of time periods of a chilling cycle; and automatically adjusting a set point of the chiller during the chilling cycle using the predicted quantity of energy.

Furthermore, in accordance with some embodiments of the present invention, the predicted flow of heat is calculated using a predicted condition selected from a list of conditions consisting of temperature, humidity, solar irradiance, and internal radiated energy.

Furthermore, in accordance with some embodiments of the present invention, predicting the quantity of energy includes determining a thermal characteristic using a measured temperature of the chiller fluid, a measured temperature of the area, and a measured outdoor temperature.

Furthermore, in accordance with some embodiments of the present invention, empirically determining the thermal characteristic further includes using a measured energy use by the chiller.

Furthermore, in accordance with some embodiments of the present invention, the thermal characteristic includes a thermal conductivity or internally radiated energy.

Furthermore, in accordance with some embodiments of the present invention, predicting the quantity of energy includes calculating a chiller set point for a time period of the plurality of time periods to enable maintaining the temperature of the area at the desired temperature during that time period.

Furthermore, in accordance with some embodiments of the present invention, adjusting the set point includes determining whether a length of that time period is sufficient for changing a temperature of a chiller fluid to the calculated chiller set point.

Furthermore, in accordance with some embodiments of the present invention, adjusting the set point includes adjusting the set point to a chiller fluid temperature that is achievable during that time period when it is determined that the length of that time period is insufficient for changing the chiller fluid temperature to the calculated set point.

Furthermore, in accordance with some embodiments of the present invention, adjusting the set point includes for a first interval of the chilling cycle so as to increase energy consumption during the first interval while reducing energy consumption during a second interval of the chilling cycle.

Furthermore, in accordance with some embodiments of the present invention, the method further includes calculating a cost of the predicted consumed energy, wherein adjusting the set point includes reducing a total cost of the consumed energy over the course of the chilling period.

Furthermore, in accordance with some embodiments of the present invention, a unit price of the consumed energy is less expensive during a first interval of the chilling cycle than during a second interval of the chilling cycle, and wherein adjusting the set point includes changing the set point during the first interval or during the second interval to increase energy consumption during the first interval while decreasing energy consumption during the second interval.

There is further provided, in accordance with some embodiments of the present invention, a method including: predicting, using a predicted flow of heat into an area, a quantity of energy used by a chiller to maintain a temperature of the area at a desired temperature during each of a plurality of time periods of a chilling cycle; and automatically adjusting a set point of the chiller for a plurality of time intervals of the chilling cycle such that the quantity of energy predicted to be used by the chiller conforms to a predetermined criterion.

Furthermore, in accordance with some embodiments of the present invention, predicting the quantity of energy includes calculating a chiller set point for a time period of the plurality of time periods to maintain the temperature of the area at the desired temperature during that time period, wherein the criterion includes availability of sufficient time during that time period to change a temperature of a chiller fluid to the calculated chiller set point during that time period, and wherein adjusting the set point includes adjusting the set point to a temperature that is achievable during that time period upon a determination that sufficient time is not available during that time period.

Furthermore, in accordance with some embodiments of the present invention, a unit price of the consumed energy is less expensive during a first interval of the plurality of time intervals than during a second interval of the plurality of time intervals, the criterion includes minimizing a total cost of the consumed energy over the course of the chilling period, and wherein adjusting the set point includes changing the set point for the first interval or for the second interval so as to increase energy use by the chiller during the first interval and decrease energy use by the chiller during the second interval.

There is further provided, in accordance with some embodiments of the present invention, a device configured to predict a quantity of energy used by a chiller to maintain a temperature of an area at a desired temperature during each of a plurality of time periods of a chilling cycle, the predicted quantity of energy calculated from a predicted flow of energy into the area, and to cause the controller to adjust a set point of the chiller for a time interval of the chilling cycle using the predicted quantity of energy.

Furthermore, in accordance with some embodiments of the present invention, the device is configured to obtain a predicted condition selected from a list of conditions consisting of temperature, humidity, solar irradiance, internal radiated energy, and an energy price.

Furthermore, in accordance with some embodiments of the present invention, the device is configured to communicate with a sensor to measure chiller fluid temperature, temperature of the area, outdoor temperature, or energy use by the chiller.

Furthermore, in accordance with some embodiments of the present invention, the device is configured to determine a thermal characteristic for use in predicting the quantity of energy using the obtained measured quantity.

Furthermore, in accordance with some embodiments of the present invention, the thermal characteristic includes a thermal conductivity or internally radiated energy.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

DETAILED DESCRIPTION OF EMBODIMENTS

Figure 1A:
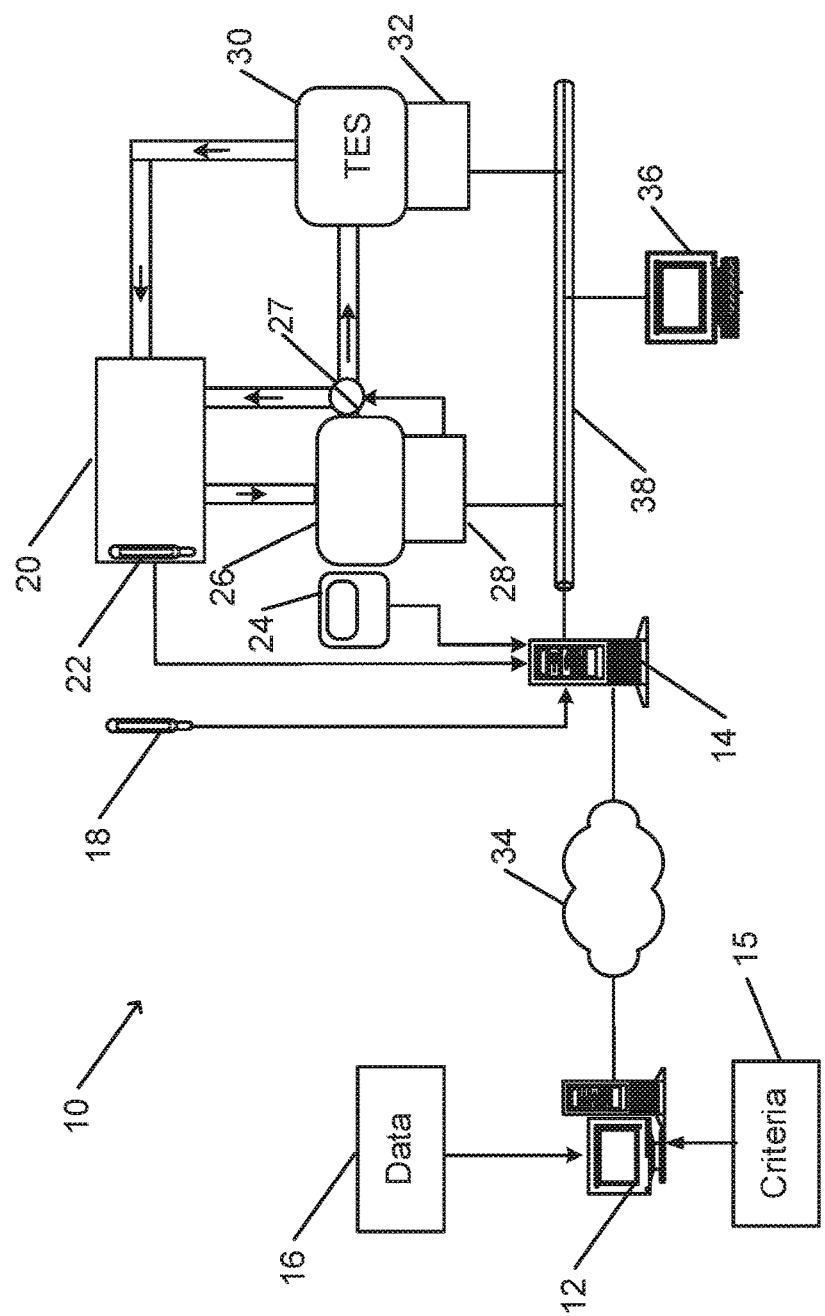
FIG. 1A is a schematic diagram of a chiller control system in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Unless specifically stated otherwise, as apparent from the following discussions, it is appreciated that throughout the specification, discussions utilizing terms such as "selecting," "evaluating," "processing," "computing," "calculating," "associating," "determining," "designating," "allocating", "comparing" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. In some embodiments, one or more methods of embodiments of the invention may be stored on an article such as a memory device, where such instructions upon execution by for example a processor result in a method of an embodiment of the invention. In some embodiments, one or more processors may perform one or more of the processes described herein, or more that one of such processes may be performed by a single processor.

In accordance with embodiments of the present invention, a chiller for providing cooled or heated water to a heating, ventilation, and air conditioning system (HVACS) is configured to cool or heat (herein both referred to as chilling) a fluid, such as water, to a set temperature, or set point. The chilled fluid is conveyed to a heat exchanger in each of one or more rooms or other areas of a building or structure, collectively referred to herein as a facility. Air may be passed through the heat exchanger in order to cool or heat the air in the room.

Reference herein to water as the chiller fluid should be understood as referring to any fluid that is suitable for operation of a chiller or an HVACS.

A set point is predetermined for each time period of a chilling cycle. A chilling cycle may include a 24-hour day-night cycle or other period in time during which ambient conditions that affect operation of the chiller vary in an approximately cyclical manner. The set point is predetermined on the basis of predicted heat flow in area whose temperature is to be controlled. For example, such an area may include a representative room (e.g. an actual room selected from among the rooms, or a virtual room whose characteristics are selected to represent all of the rooms, or a subset of all of the rooms), a subset of all of the rooms, or an entire building or facility. (A set of areas whose temperatures are controlled by a common chiller are herein referred to as a facility.) A heat flow may be predicted on the basis of various predicted conditions. Such predicted conditions may include ambient temperature or humidity, solar irradiance, wind direction and speed, precipitation, cloud cover, haze or smog, or other meteorological or environmental conditions. Other predicted conditions may affect heat generation within a room. Such conditions may include, for example, predicted occupancy of the area, predicted activities within the area, predicted use of machinery or electronic equipment within the area. Other conditions may include a price or availability of electrical power or of another power source during each period.

Embodiments of the invention may enable optimization of chiller performance in accordance with various conditions while taking energy costs or other criteria into account. Optimization may include adjusting chiller set points in accordance with predetermined criteria that are based on predicted energy consumption by the chiller. Optimization may include regulation or adjustment of the chiller set point (e.g., modifying from a previously calculated value) on the basis of cyclic (e.g. 24-hour) multi-parametric planning in accordance with one or more of: weather conditions, dynamic electricity prices, and thermal storage capacity of the controlled HVACS facility. Optimization may further include one or more of: automatic detection of the thermal storage capacity of the facility, aggregation of managed loads by an automatic demand adaptation (ADA) system to increase electrical power production efficiency and generator utilization, and shading of chillers to reduce the effective outdoor temperature in the chiller's vicinity.

Planning of a chiller's set point as described herein may lower cost of energy of operation of HVACS.

Cost of HVACS operation may depend on factors such as a quantity of energy that is required to maintain a desired temperature and the price of electrical power during a given period. The water temperature in the chiller may be determined by the chiller's set point. The energy required to maintain the set point may vary based on the difference between the set-point and the outdoor temperature. For example if the ambient outdoor temperature at night is 24° C. and the desired room temperature is 24° C., the chiller's set point may be 24° C. as well and no energy is required to maintain the set point. However, when the ambient outdoor temperature during the day is 34° C., in order to maintain the room temperature at 24° C., the water temperature should not exceed 7° C. Thus, if the temperature of water in the chiller at night were allowed to rise to 24° C., a large amount of energy would have to be expended during the following day (when electrical power rates may be high) to reduce the water temperature, for example, to below 7° C. during the day. In such a case, it may be desirable to pre-cool the water, or even a building or area, in advance of peak outdoor temperatures, e.g. at night (when electrical power rates may be reduced). On the other hand, in a case that the outdoor temperature is not expected to increase significantly during daylight hours, such pre-cooling may not be desirable or cost effective.

The cost of chilling an area may be tied to the water temperature in the chiller at some time before the area is to reach a desired temperature. Planning control of the water temperature accordingly may optimize costs for a daily cooling cycle. Energy usage by HVACS may also depend on the relative humidity of the area since humid air has a higher heat capacity than dry air.

Thus, in accordance with some embodiments of the present invention, a method for controlling operation of a chiller includes obtaining (e.g., calculating on the basis of predicted conditions that may include ambient weather conditions, solar irradiance, or generation of heat within areas of a facility) a predicted flow of heat into an area (e.g., a representative room) of a facility. The predicted flow of heat is used to predict a quantity of energy that would be used by a chiller in order to maintain a temperature of the area at a desired temperature during each of a first set of a plurality of time periods (e.g., a few minutes, such as 5 minutes to 10 minutes) of a chilling cycle (e.g., a 24 hour day-night period). The set point of the chiller is automatically set for each of a second set of a plurality of intervals or time periods (which may be different than, e.g., longer than, the time periods of the first set) of the chilling cycle using the predicted quantity of energy, e.g., such that the predicted energy use conforms to one or more predetermined criteria (e.g., achievability of a change of temperature dictated by the set point or minimizing energy costs).

A system in accordance with an embodiment of the invention may receive forecasted or expected weather conditions from an external source. Such an external source may include a weather forecasting center or computer. Forecasted weather conditions may include the expected temperature and humidity for the day ahead, as well as expected electrical power price rates. Based on the forecasts and on the chiller's characteristics or restrictions, a system in accordance with an embodiment of the invention may compute a desired set point of a chiller for one or more given intervals during the cycle period. For example, a suitable interval may range from 15 minutes to an hour. Determination of the set point may involve calculating the energy cost that is required to maintain the water temperature at the set point, and the energy cost required to achieve the following set point. A system in accordance with embodiments of the invention may optimize efficiency by decreasing energy usage during a period when energy use is more expensive while increasing usage in a period when energy is less expensive. Thus, a desired temperature may be maintained in the facility at minimal cost.

A system in accordance with embodiments of the invention may utilize learned thermal or thermodynamic characteristics of an HVACS or an area to be heated or cooled, such as a room, or thermal insulation or thermal mass characteristics of a chiller, or of the facility or facility elements.

A HVACS may have built-in or added thermal storage capacity. For example, such capacity may be expressed as a time that is required to raise the chiller's water temperature by 1° C. as a function of the current set point and the outdoor temperature. This time may also depend on an outdoor temperature and relative humidity in the vicinity of the chiller. Energy usage may be planned on the basis of such factors during designated intervals of a chilling cycle. For example, prior to an hour where a peak temperature is expected, the chiller's water temperature may be cooled to a low temperature, e.g. close to 0° C. The temperature may then be allowed to rise to a higher temperature, for example, 12° C., as the day proceeds. If, for example, the average time to change the water temperature by 1° C. is 5 minutes, then the chiller may be idle for an entire hour during the hottest part of the day, thereby saving energy during peak cost intervals. In accordance with embodiments of the invention, a system may be configured to automatically learn thermal storage features of a system or facility and keep records of them. The features may be used in developing and implementing functions of ambient temperature, relative humidity, or energy requirements for use in planning cooling or heating.

In accordance with some embodiments, an automatic demand adaptation (ADA) capability may allocate energy usage among one or more chillers in one or more HVACS to achieve efficient usage of electrical power.

Energy usage may vary based on the effective temperature in a region around a chiller. Direct solar irradiation may increase the effective temperature by more than 70% when compared with the temperature measured in shade.

Figure 1B:
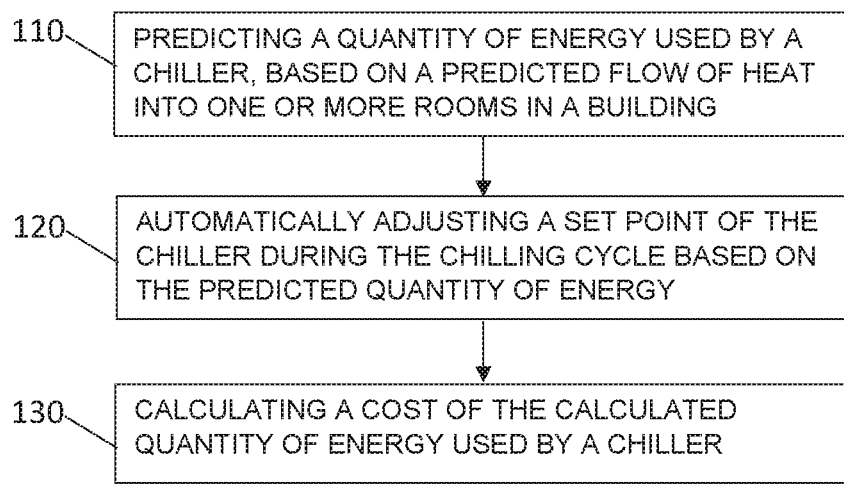
FIG. 1B is a flowchart of a method of controlling a chiller cording to some embodiments of the invention, wherein boxes 110, 120 and 130 represent steps of the method.

FIG. 1 is a schematic diagram of a chiller control system in accordance with an embodiment of the present invention.

A chiller control system 10 in accordance with embodiments of the present invention includes an intelligence center 12 and a control center 14.

Intelligence center 12 may receive external data 16. External data 16 may include predicted conditions that may include, for example, weather forecast data or utility price data. For example, weather forecast data, such as hourly (or otherwise periodic) temperature or humidity predictions, may be obtained from a weather forecast center. Utility price data may be received from a utility or an independent service operator (ISO). Utility price data may include a prediction of energy (e.g., electrical power or a fuel that is utilized for operation of chiller 26) prices for a coming day, or for anther interval. External data 16 may include data related to solar irradiance (e.g., calculable from a model that uses a location, orientation, or radiative properties of room 20 (e.g., empirically determined), predicted sky conditions, or other data as input) or to internally radiated or otherwise generated heat or energy (e.g., empirically determined, e.g., as a function of hour, day of week, season, or other parameter).

Intelligence center 12 may receive one or more criteria 15. Criteria 15 may be utilized in planning set points for operation of chiller 26. Criteria 15 may be preprogrammed (e.g., saved in the form of programmed instructions for operation of intelligence center 12), or entered by a human operator (e.g., via an appropriate user interface, e.g., via console 36).

In accordance with external data 16 and criteria 15, and in accordance with data relating to a specific facility, such as HVACS thermodynamics features, intelligence center 12 may prepare a plan for chiller activation. The chiller activation plan may include a set of set-point values that are computed so as to conform to a requirement, such as minimizing energy costs while maintaining a required room temperature. Intelligence center 12 transmits the plan, e.g. via network 34, to control center 14, which is responsible for implementing the chiller activation plan.

Control center 14 receives a chiller activation plan that was prepared by intelligence center 12 and implements the plan, e.g. to operate chiller controller 28 to reset a set point of chiller 26 at predetermined times. Control center 14 may control a rate of transport of a heated or cooled fluid to or from chiller 26, thermal energy storage (TES) unit 30, and room 20 by controlling operation of fluid control 27 (represented as a valve, but may represent a plurality of fluid transport or control units such as pumps, fans, and valves). Control center 14 monitors the temperature of one or more rooms 20 (e.g. each provided with one or more thermometers 22), as well as the ambient temperature (e.g. by monitoring an external thermometer 18). Control center 14 may be configured to alter the chiller activation plan if a measured value (e.g. temperature or power usage) deviates from a predicted value. An additional function of control center 14 is to learn a facility's thermodynamic features. For example, control center 14 may analyze weather condition data and energy usage (e.g. by monitoring a power meter 24), energy storage or utilization of stored energy (e.g. by communicating with TES unit 30 via a TES controller 32), or the temperature of chiller 26 when a compressor of chiller 26 is not in operation. Control center 14 may communicate with various components of chiller control system 10 via communications channel 38. A user (e.g., a building manager) may control or monitor operation of control center 14 via console 36.

Concurrent measurements of such quantities as a temperature of a chiller fluid temperature (e.g. leaving chiller 26) a temperature of room 20 (using thermometer 22), and an outdoor temperature (using external thermometer 18) may be utilized (e.g., by intelligence center 12) to calculate one or more thermal characteristics. Energy use by chiller 26 may also be measured (using power meter 24). The calculated thermal characteristics may be utilized in predicting energy usage or consumption by chiller 26. Calculated thermal characteristics may include one or more thermal conductivities (e.g., between room 20 and the ambient atmosphere, between chiller 26 and the ambient atmosphere, or between a heat exchanger 44, FIG. 2, and room 20 or chiller 26) or internally radiated or generated energy (e.g., within room 20).

In the discussion below, the energy flow is assumed to be always from a hotter place to the colder one. Therefore in a case of cooling, the energy flow is from outdoors into the chiller system and into the facility, and also from the facility into the chiller system. In the case of heating the energy flows from the facility to outdoors and from chiller system into the facility and outdoors. The chiller system as used herein refers to: the compressor, pumps, pipes ventilation and other parts of the HVACS that cool or heat a fluid and transport the fluid to the facility rooms and areas for heat exchange.

Figure 2:
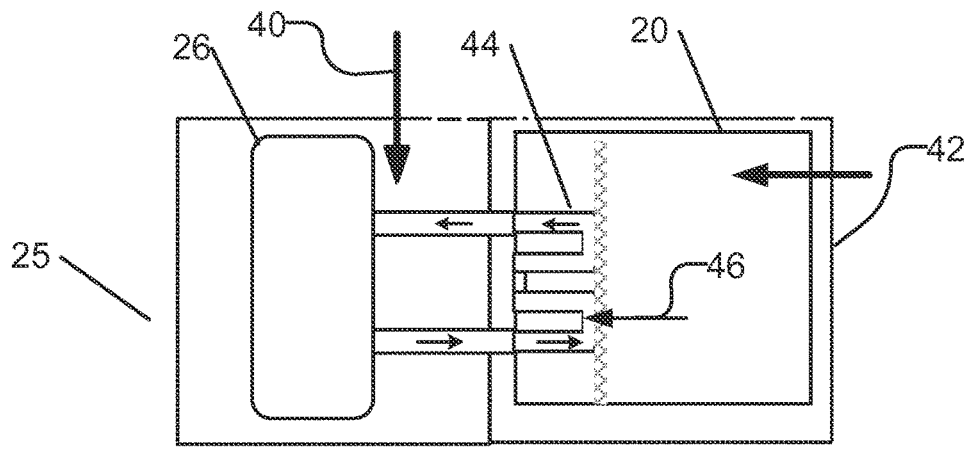
FIG. 2 schematically illustrates heat flow in an HVACS.

FIG. 2 schematically illustrates heat flow in an HVACS. Heat is exchanged between chiller 26 and room 20 via heat exchanger 44. Room 20 may represent a representative room of the facility.

FIG. 2 and the following equations and discussion relate to either cooling or heating of a room or of a chiller fluid. For simplicity, the discussion below, as well as the related equations and methods, are described in accordance with a model of cooling room 20 (e.g., when the outdoor temperature is greater than a desired temperature of room 20). However, by reversing the directions of heat flow, the discussion may be applied to heating room 20 as well. However, when heating, the direction of the flow of heat, such as of heat flow 40, 42, or 46, is opposite to the direction indicated by the corresponding arrow. Discussion of energy flows below is to be understood as including negative energy flow of heat in a direction that is opposite to the indicated direction. Quantitatively, heating may be represented by reversing signs of heat flows, with corresponding reversal of inequality signs.

Energy flow Ef from the outside atmosphere into the HVACS with a chiller system 25 may be approximated by the equation $Ef=(DToc) \cdot Cco+(DTor) \cdot Cro$ where: $DToc=CEfTo-Tc$ is a difference between the chiller-effective outdoor temperature CEfTo and chiller fluid temperature Tc (at the point where the fluid exits chiller 26), $DTor=REfTo-Tr$ is a difference between the room-effective outdoor temperature REfTo and a room temperature Tr, Cro is the heat conductivity of heat flow 42 into room 20, and Cco is the heat conductivity of heat flow 40 into chiller system 25.

Outdoor temperature To is the outdoor temperature measured in the shade. An effective temperature CEfTo or REfTo is To plus some additional factor that results from direct solar irradiation on chiller system 25 or on room 20, respectively. The solar irradiation effect depends on an angle between a surface, e.g., of chiller system 25 or of room 20, and the sun. Therefore CEfTo is typically different from REfTo.

An effective temperature may be expressed as $EfTo=To+SRE(D,H,AF,CL)$, where SRE, the solar irradiation effect, is represented as a function of day of year D, hour of day H, surface absorption factor AF, and cloud cover represented by cloud level CL.

Tests have shown that solar radiation on walls of a building, or a room 20, has a very small impact on the total energy flow and therefore is neglected in the following discussion. Thus it is assumed that REfTo=To. The impact of solar irradiation on chiller may be very high, increasing the chiller-effective temperature by more than 70% and is further discussed below.

Energy flow 46 from room into the chiller system may be expressed by Efrc=(Tr−Tc) Crc, where Crc is the heat conductivity between chiller system 25 and room 20.

Factors Cco, Cro, and Crc are approximated heat conductivity factors between elements of chiller system 25 and the outside atmosphere, between room 20 and the outside atmosphere, and between room 20 and the chiller system 25, respectively. Factor Crc includes also a contribution due to ventilation. All of the conductivity factors may be obtained automatically by the system by an iterative solution of linear equations during a learning process.

The electrical power required by the HVACS to compensate for a inward (in the case of cooling) or outward (in the case of heating) flow of heat may be expressed as:

$$Ef/COP(Tc,CEfTo),$$

where COP, the coefficient of performance (efficiency), is a function of Tc and CEfTo, and may be proportional to Tc/DToc, (Tc is expressed in the Kelvin scale). The electrical energy required during a time period of length t to maintain the chiller temperature at Tc and, as a result, the room temperature at Tr may be expressed as (substituting for Ef):

$$E=t \cdot ((DToc \cdot Cco) + (DTor \cdot Cro) + IRE)/COP(Tc,CEfTo)) \quad \text{Equation 1}$$

where IRE represents internally generated or radiated energy, e.g. by people, building walls, and by machinery or appliances.

Theoretically, the highest COP for a heat pump (chillers are heat pumps) with fluid temperature Tc and outdoor effective temperature CEfTo, is Tc/DToc, as determined by the Carnot cycle. The actual COP of chillers is much lower, but is a function of this expression. Experience has shown that the influence of Tc is sometimes not linear, so that the actual COP may be approximated as follows:

$$COP = (Tc^{Ex}/DToc) \cdot Lco,$$

where Ex is an exponential coefficient, $1 \leq Ex \leq 2$, and Lco is a linear coefficient. Both coefficients may be found automatically by the system by solving equations during a learning process.

The expression for energy requirement E may be rewritten as (substituting for COP and DToc) Equation 2:

$$E=t((CEfTo-Tc)^2 \cdot Cco + (CEfTo-Tc) \cdot (DTor \cdot Cro + IRE))/ (Tc^{Ex} \cdot Lco)) \quad \text{Equation 2}$$

implies that the energy usage depends strongly upon chiller temperature (set point) Tc. A small change of the chiller's set point, Tc, results in a large change in the energy required to keep the desired temperature. For example changing a set point by 1 degree, e.g. from 7° C. to 8° C. when the outdoor temperature is 30° C., may result in an energy savings of more than 9%.

In order to maintain a desired temperature Tr inside a room 20 when the outdoor temperature is To, the energy flow from that room into the chiller system 25 must be no smaller than the energy flow from outdoor and internal heat sources into the room. This criterion may be used to calculate a set point Tc during a given time period so as to maintain desired temperature Tr.

The temperature change DT over a time t in a chilled room may be expressed as:

$$DT/t=((To-Tr) \cdot Cro + (Tin-Tr) \cdot Cir + (Tc-Tr) \cdot Ccr)/RTM,$$

where (To−Tr)·Cro is an amount of energy flow 42 between the outside atmosphere and room 20, proportional to the temperature difference between outdoor temperature To and room temperature Tr, Cro being the heat transfer or conductivity factor.

The term (Tin−Tr)·Cir represents an energy flow between an internal heat generator and room, proportional to the temperature difference between the temperature of the internal heat generator, Tin, and room temperature Tr, where Cir is the heat transfer factor. Tin may vary over time. For example, Tin may change from month to month, e.g., sinusoidally between 28° C. in July and August, decreasing to 16° C. in February.

The term (Tc−Tr)·Crc represents an energy flow between the chiller's heat exchanger 44 and room 20, and is proportional to the temperature difference between the chiller's water temperature, approximately Tc, and the room temperature Tr, where Crc is the heat transfer factor.

RTM is the thermal mass of the room (room thermal mass).

If DT/t is less than zero, the temperature Tr inside the room decreases. Therefore, when cooling, Tc should be such so as to ensure DT/t<0 or $$(To-Tr) \cdot Cro + (Tin-Tr) \cdot Cir + (Tc-Tr) \cdot Ccr < 0$$

and for heating we need DT/t>0 or $$(To-Tr) \cdot Cro + (Tin-Tr) \cdot Cir + (Tc-Tr) \cdot Ccr > 0.$$

This can be expressed as:

$$Tc < (Tr - (To-Tr) \cdot Cro/Crc + (Tin-Tr) \cdot Cir/Crc) \text{ for cooling and}$$

$$Tc > (Tr - (To-Tr) \cdot Cro/Crc + (Tin-Tr) \cdot Cir/Crc) \text{ for heating.} \quad \text{Equation 3:}$$

We now describe a procedure for calculation of the energy required for cooling a room. The same procedure may be applied to heating the room, but with the energy flow reversed (from inside the room to the outside and from the chiller system into the room). When applied to heating, the signs of energy terms in the following equations are reversed and the directions of the inequalities are reversed.

When the chiller operates at some given electrical power consumption Pe, the chiller produces during a period dt, thermal energy expressible as $$Et = Pe \cdot COP(Tc,CEfTo) \cdot dt.$$

During a computation period of time, dt, (e.g., for an iterative computation method) the energy flow rate inside the room and inside the chiller system may be expressed as, in accordance with Equation 1 above:

$$E = dt \cdot ((DToc \cdot Cco) + (Dtor \cdot Cro))/COP(Tc,CEfTo))$$

If Et>E, then the energy difference Et−E implies a reduction of the temperature of the chiller water by dT=(Et−E)/WW, where WW represents a thermal capacity of the water or other chiller fluid, determined by the mass or weight of the water or of the fluid in the chiller system and by the specific heat of the fluid.

The resulting water temperature is Tcnew=Tc−dT<Tc. As a result of the cooling, energy flow increases during the following period dt, and COP is reduced. Therefore, during temperature reduction the energy required to reduce the Tc by an additional temperature difference dT continues to increase.

The electrical energy EE required to reduce the temperature of fluid in the chiller may be computed by an iterative method.

Inputs to the method may include: dt (the period for each iteration, e.g., in seconds or minutes), Tc, To, Cco, Cro, CEfTo, Tr (representing a desired room temperature), and WW, all as defined above. Other inputs include: CRP, the rated power of the chiller, including the expected power consumption at a given moment (determined at least in part by the temperatures difference and specific operation logic of the chiller; e.g., in units of kW); IRE, the internal radiated energy flow (e.g., in units of kcal per time unit or watts); and TimeLimit, a limit on the period of time in which the temperature is to be reduced.

Outputs of the method include calculated values of EE and dT, as defined above.

In accordance with the iterative energy computation method 300, temperature differences DToc=CefTo−Tc and DTor=To−Tr are computed, as above.

Energy compensation EC, the energy required to compensate for the energy flow between the chiller, the room and the outside atmosphere to maintain current chiller and room temperatures Tc and Tr may be computed as:

$$EC = ((DToc) \cdot Cco + (DTor) \cdot Cro + IRE) \cdot dt,$$

e.g., in units of calories.

Electrical energy EE used by chiller in a time period dt may then be calculated as EE=CRP·dt, e.g., in units of kWh. The thermal energy TE generated by the chiller may be calculated as TE=EE·COP (Tc, DToc)·W2Ccoef, where W2Ccoef represents a conversion factor from watts to calories. Energy changing temperature ECT, the portion of TE that is available to change the temperature of the chiller fluid (e.g., in units of kcal) may then be calculated as ECT=(TE−EC). The temperature change may then be calculated:

$$dT = ECT/WW.$$

The procedure for calculating the temperature difference dT during a time interval dt may be applied to compute the energy and amount of time required to achieve a temperature reduction in a chiller from a starting temperature Tstart to a target temperature TT. If the time exceeds a given time limit, TimeLimit, the procedure sets a Boolean variable, Valid, to false to indicate that the temperature cannot be achieved within the time limit.

Figure 3:
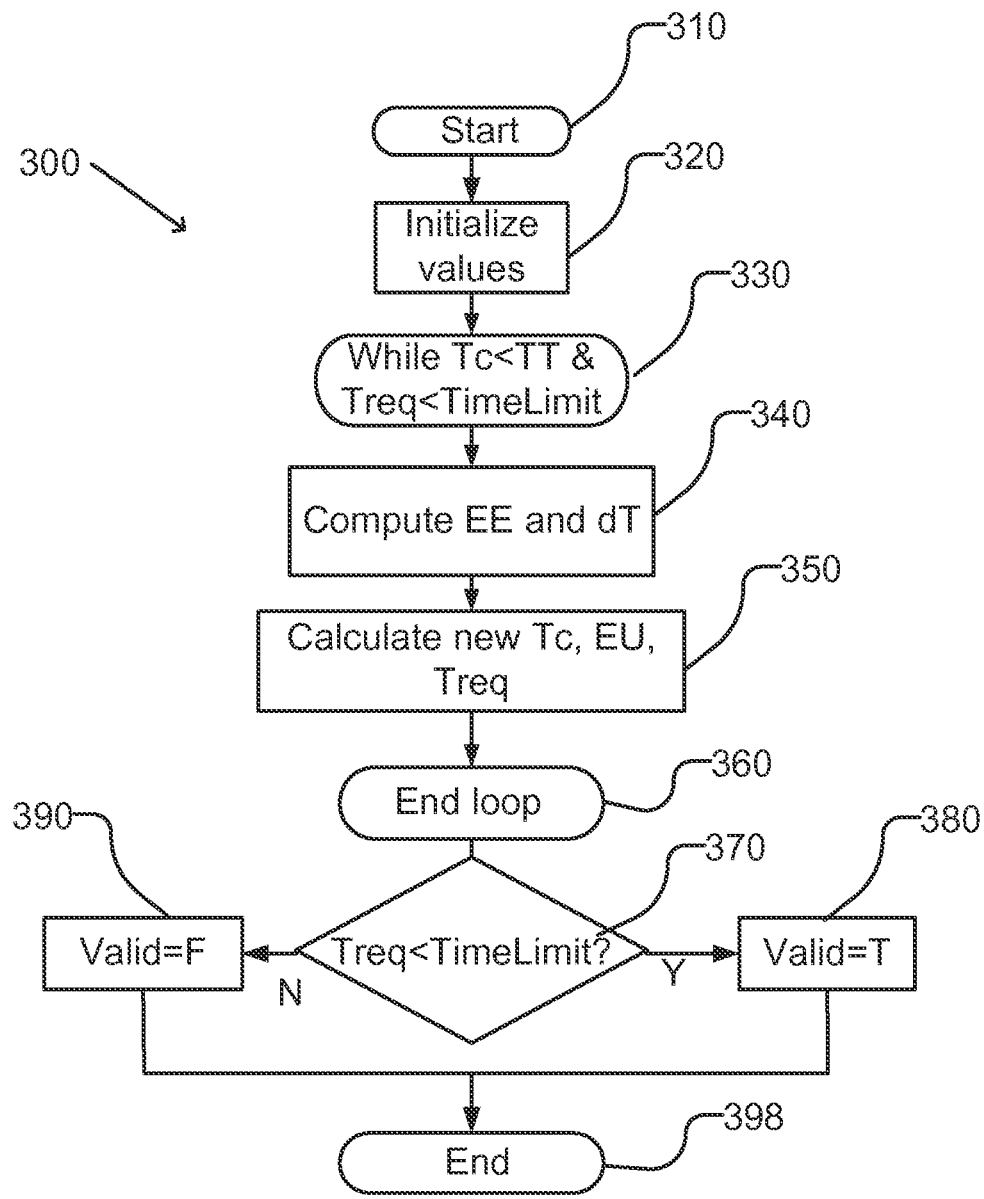
FIG. 3 is a flowchart illustrating an iterative method for computing energy for reducing the temperature of fluid in a chiller.

FIG. 3 is a flowchart illustrating an iterative method for computing energy for reducing the temperature of fluid in a chiller. Iterative energy computation method 300 may be executed by a suitable processor, e.g. a processor that is associated with an intelligence center, a control center, or a user console of a HVACS.

It should be understood with respect to all flowcharts discussed herein that the division of an illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other examples of the illustrated method.

Similarly, it should be understood that, unless indicated otherwise, the illustrated order of execution of the operations represented by blocks of any flowchart discussed herein has been selected for convenience and clarity only. Operations of the illustrated method may be executed in an alternative order, or concurrently, with equivalent results. Such reordering of operations of the illustrated method should be understood as representing other examples of the illustrated method.

Iterative energy computation method 300 includes starting (block 310) with the following inputs: TT, Tstart, dt (iteration period), and TimeLimit, all as defined above.

Outputs at the end (block 398) of execution of iterative energy computation method 300 may include one or more of: EU, the energy consumed in reducing the temperature; Treq, the time required for reducing the temperature; Tcnew, the new water temperature (set point); and Valid, a Boolean variable returned with a true value "T" if target temperature TT is achievable during time limit TimeLimit, and a false value "F" if not.

In accordance with iterative energy computation method 300, chiller temperature Tc is initialized to starting temperature Tstart, and Treq and EU are initialized to zero (block 320).

A loop is initialized that executes as long as Tc is greater than TT and as long as Treq is less than TimeLimit (block 330 through block 360).

In each iteration of the loop, the temperature change dT and electrical energy EE consumed is computed for an iteration period dt (block 340). The calculation of dT and EE is as described above, on the basis of input values of To, CEfTo, Tr, WW, CRP, and IRE.

The values of Tc, EU, and Treq are iterated (block 350). The value of Tc is iterated by adding the calculated value of dT, and EU is iterated by adding the calculated value of EE. Time Treq is iterated by adding the iteration period dt.

After the loop has ended (block 360), the current iterated value of Treq is compared with TimeLimit (block 370). If Treq is less that TimeLimit, TT is achievable in time period TimeLimit and the Boolean variable Valid is assigned a value "True" (block 380). If not, Valid is assigned a value "False" (block 390).

At the end (block 398) of execution of iterative energy computation method 300, one or more of EU, Treq, Tcnew (the new water temperature, set equal to the current value of Tc), and Valid are output.

As described above, when the desired water temperature of the chiller is higher than its current temperature Tc, energy flow may be allowed during a period dt to cause an increase of temperature.

The new water temperature, Tcnew, after period dt is then greater than the value of Tc before the elapse of period dt. The increased value of the water temperature may result in reduced energy flow in the following period dt. When the temperature is allowed to rise, no energy is required to be expended by the chiller.

Input for a calculation of the increase in temperature includes dt, Tc, To, Cco, Cro, CEfTo, Tr (desired room temperature), WW, and IRE (e.g. in units of kJoule or kCal per time unit), all as defined above. Output of the calculation includes temperature change dT. The calculation includes computing temperatures differences DToc=CefTo−Tc and Dtrc=Tr−Tc. The energy E (e.g., in calories) entering the system from the outside atmosphere during period dt, may be computed as discussed above: E=dt·((DToc·Cco)+(Dtrc·Cro)+IRE). The change in the water temperature during period dt may then be computed as dT=E/WW.

An iterative procedure may be applied to calculate the time required for an increase in water temperature from an initial temperature Tstart to a target temperature TT.

Figure 4:
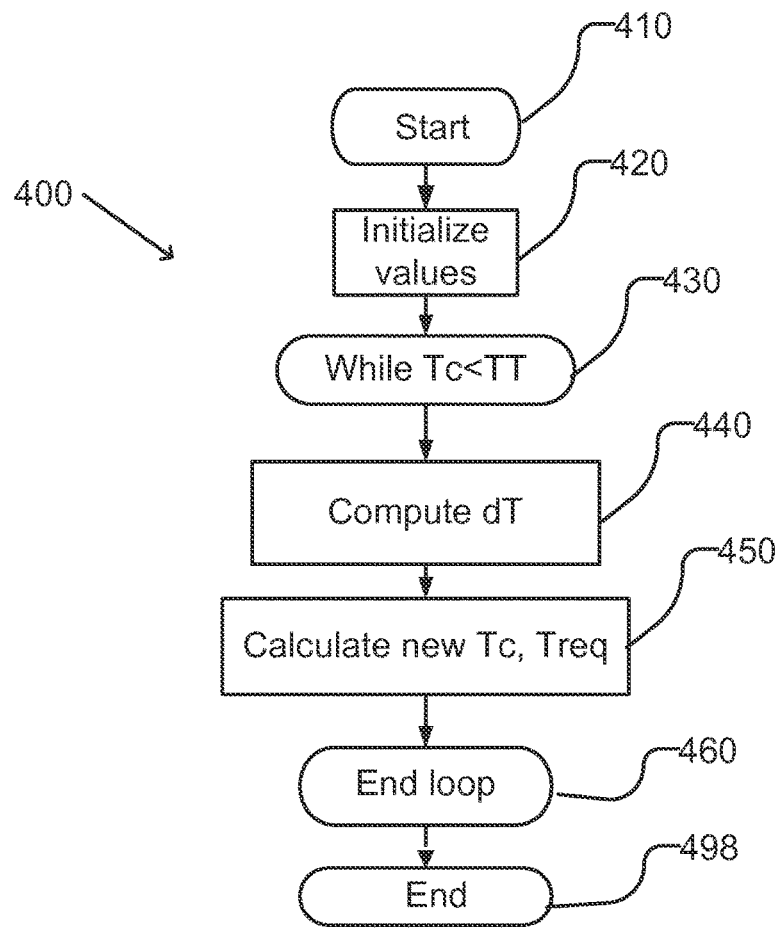
FIG. 4 is a flowchart illustrating an iterative method for a time of a temperature change of fluid in a chiller.

FIG. 4 is a flowchart illustrating an iterative method for a time of a temperature change of fluid in a chiller. Iterative time computation method 400 may be executed by a suitable processor, e.g. a processor that is associated with an intelligence center, a control center, or a user console of a HVACS.

Iterative time computation method 400 includes starting (block 410) with the following inputs: TT, Tstart, and dt (iteration period), all as defined above.

Outputs at the end (block 498) of execution of iterative time computation method 400 may include Treq, the time required for increasing the temperature; and reducing the temperature; Tcnew, the new water temperature.

In accordance with iterative time computation method 400, chiller temperature Tc is initialized to starting temperature Tstart, and Treq is initialized to zero (block 420).

A loop is initialized that executes as long as Tc is less than TT (block 430 through block 460).

In each iteration of the loop, the temperature change dT is computed for an iteration period dt (block 440). The calculation of dT is as described above, on the basis of input values of To, CEfTo, Tr, WW, and IRE, as defined above.

The values of Tc and Treq are iterated (block 450). The value of Tc is iterated by adding the calculated value of dT. The value of time Treq is iterated by adding the iteration period dt.

After the loop has ended (block 460) the current value of Treq and the value of Tcnew (the new water temperature, set equal to the current value of Tc) are output and execution of iterative time computation method 400 is ended (block 498).

Computation of the effective outdoor temperature with respect to the chiller, CEfTo, includes the outdoor temperature To as measured in shade and takes into account the effect of direct solar irradiation on the chiller's surface. The value of CEfTo may be approximated as follows: CefTo=To+SRT (D, H, MaxRad, CL), where SRT is a sun radiation term and is a function of day of the year D, hour of day H, maximal solar irradiation MaxRad when the sun is directly overhead, and level of cloudiness CL.

Figure 5A:
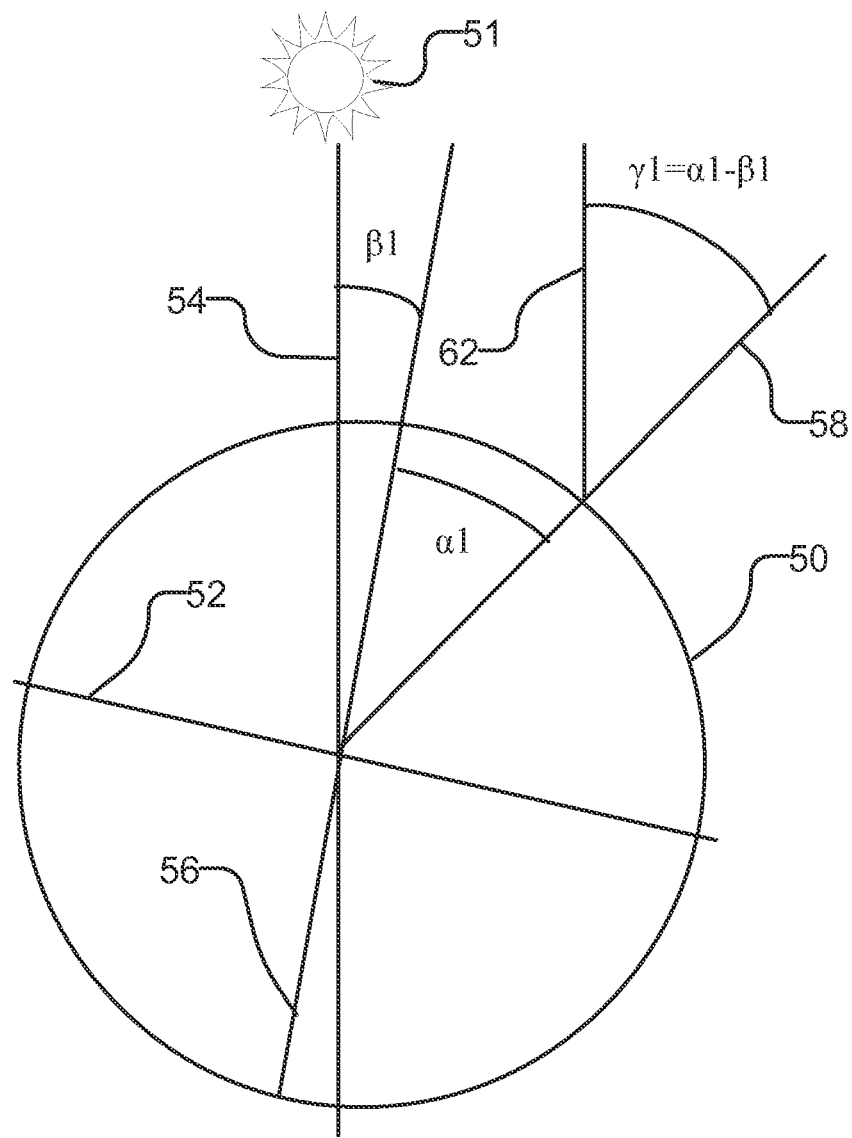
FIGS. 5A and 5B illustrate quantities referred to in calculating effects of solar irradiation.
Figure 5B:
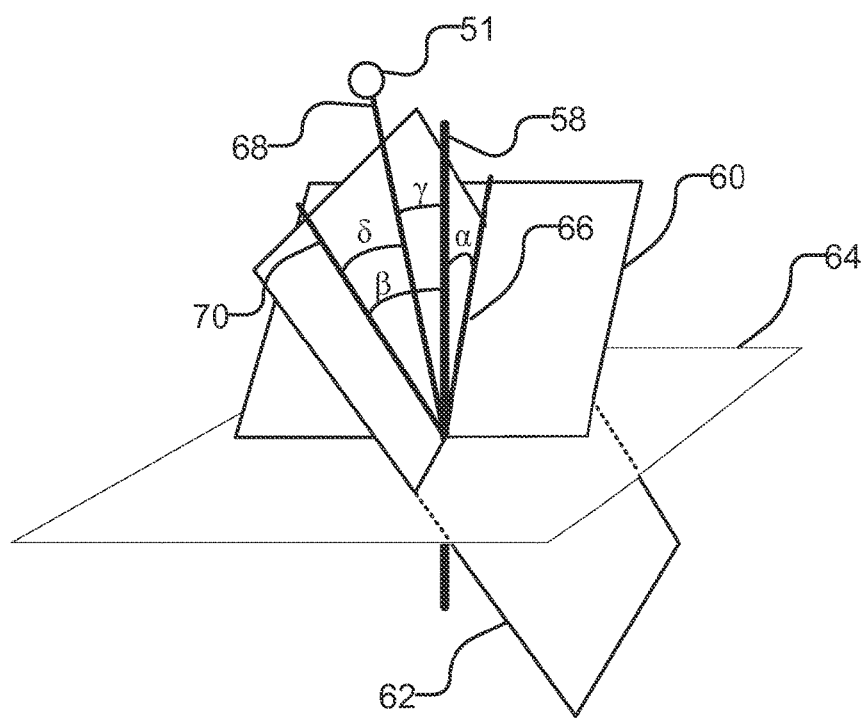

FIGS. 5A and 5B illustrate quantities referred to in calculating effects of solar irradiation.

We may estimate SRT as SRT=cos γ·MaxRad·CL, where γ is an angle between a line of sight 68 to sun 51 and a normal 58 to the chiller surface 64 (e.g. of a flat roof or wall of the chiller). Alternatively, γ may be defined as an angle between the normal 58 to chiller surface 64 and intersection 66 between day plane 62 and hour plane 60. MaxRad may be obtained during a learning process and CL may be derived from a weather forecast. CL may vary from 1 for a clear sky to 0 for a very cloudy sky. In general, it is difficult to set an exact value for partially cloudy conditions. Therefore, values of CL may be limited to three values: 1, 0.5 and 0.

Day plane 62 is parallel to ecliptic plane 54 (plane of earth's orbit around the sun 51) and is tilted at an angle β1 (right ascension) to equatorial plane 56 (normal to rotation axis 52). Angle β1 changes during the year, from 23° 26' 16" north when the sun is directly above the Tropic of Cancer at northern summer solstice (around June 21), to 23° 26' 16" south when the Sun is directly above the Tropic of Capricorn at northern winter solstice (around December 21). The average rate of change is about 47° per year, or 0.128767° or 0.002241 radians per day. (The above dates may vary from year to year in 1 or 2 days).

Day plane 62 is parallel to equatorial plane 56 twice a year, at the equinoxes (around September 22 and March 22) when angle β1 is zero. Assuming the angle north to equator as positive and south to it as negative we get, γ1=β1−1, where α1 is the latitude of the chiller.

Day number (DN) may be defined as follows: March 22 (northern vernal equinox) is defined to have a value 0. The day number increases each day by one until June 21. June 22 is then day number 92, and the day number decreases each day by one until December 20, and then increases each day by one again until March 22. If DN is counted in this way, then β1 may be expressed in radians as DN·0.002241.

Hour plane 60 defined by line of sight 68 to sun 51 and earth's rotation axis 52 and moves due the earth's rotation by 2π/24 radians per hour.

Let us define α as an angle between normal 58 to chiller surface 64 and hour plane 60, and is calculated according to the hour of day.

Angle β is defined as an angle between chiller normal 58 and its projection 70 on day plane 62. Angle β is equal to angle γ1=β1β1 in FIG. 5A.

Angle δ is defined as an angle in day plane 62 between projection 70 and the intersection 66 (equivalent to line of sight 68) between day plane 62 and hour plane 60.

Then, referring to FIG. 5B, let us define: cos α=h/a, tan α=d/h, cos β=h/b, cos γ=h/c, tan δ=d/b, cos δ=b/c. Therefore, c=b/cos tan δ and b=h/cos β, so that c=h/(cos β·cos δ) and cos γ=cos β·cos δ.

Since tan δ=d/b, d=h·tan α, and b=h/cos β, therefore tan δ=h·tan α/(h/cos β)=tan α·cos β and δ=arctan (tan α·cos β). Therefore: cos γ=cos β·cos (arctan (tan α·cos β)).

If SZ is the time of day of the solar zenith (noon), around 12:00 local time, and H a current time of day, then: α=(H−SZ)·2π/24. If the latitude of the chiller is CLat (α1 in FIG. 5A), then we can define:

$A=\cos β=\cos(CLat-DN·0.002241)$ and $B=\cos(\arctan(\tan((H-SZ)·2π/24)·A))$.

We may thus define SRT as:

$SRT=\cos γ·MaxRad·CL=A·B·MaxRad·CL$.

Therefore, CEfTo is equal to:

$CefTo(H)=To(H)+A+B+MaxRad·CL$.

A planning process for planning operation of a chiller is now described. During the planning process, calculated values of set points may be modified in order to satisfy one or more predetermined criteria. The planning operation is described for a case where cooling is required. As discussed above, the process may be adapted for heating by suitable changes of sign and directions of inequalities. Where maximum temperatures or set points are specified for cooling, minimum temperatures or set points are substituted for heating.

A 24-hour day-night period (or other chilling cycle) may be divided into a first plurality of time periods in the form of N set point intervals (SPI). An optimal set point is calculated for each SPI. The shorter the interval size of each SPI, the calculation may be more exact but the time of computation is increased. Thus, selection of interval size may entail a compromise between precision of calculation and the time required for the calculation. The output of the planning process is an array of chiller set points. The planning process is designed to yield a solution that minimizes energy costs while providing acceptable room conditions (e.g., temperature and humidity). The output array of set points may be converted to a smaller array in accordance with characteristics of a specific chiller.

The chiller operation planning includes computing an effective outdoor temperature, finding the highest set point per time interval, computing time and energy for achieving the set points, optimizing energy costs, and producing a chiller operation program according to limitations of the specific chiller.

The effective outdoor temperature may be computed as described above: The forecasted outdoor temperature is added a direct solar irradiation effect that is computed as a function of day and hour. The input to the computation is To(Time), a forecasted outdoor temperature at time "Time." The output of the computation is CefTo(SPI), the effective temperature per each interval SPI. For example, the forecast may be provided as a temperature per hour of the day. Some calculations that are executed as part of chiller operation planning may require estimates for shorter time periods (e.g., every minute or every 5 minutes). When shorter periods are required, effective temperatures may be obtained by interpolation (e.g., linear interpolation or other interpolation).

The highest allowed set point is computed, e.g., according to Equation 3 above, but not higher than a dew point corresponding to a desired relative humidity and desired room temperature (to enable dehumidification of the room). An output of this procedure is an array, MaxSP(SPI), of maximum set points for each SPI, e.g., every 5 or 10 minutes. A set point with a temperature higher than the calculated maximum set point could result in room temperature or room humidity higher than desired (in the case of cooling).

The minimal time and energy to change a chiller fluid (water) temperature from one set point to a subsequent set point is computed, and validity (the possibility of achieving the set point in the allotted time period) of the transition is checked. The input to the computation is the MaxSP(SPI) array defined in suitably small time intervals, e.g., of 5 or 10 minutes. The output Eused(SPI) indicates the energy required for each such transition and an indication, Valid (SPI), as to whether sufficient energy can be provided by the chiller within the time limitations. If achieving the set point is indicated as not possible, the lowest possible set point that can be achieved is computed. An indication of failure to achieve a set point may be interpreted to imply that the cooling system is not suitably matched to the cooling or heating needs and is not sufficiently powerful to cool or heat the facility, or that the starting condition is exceptional or abnormal. For a given MaxSP, the energy consumption is minimal since a set point higher than MaxSP would result in room temperature or humidity above what is desired, and a lower set point would result in increased energy consumption.

Figure 6:
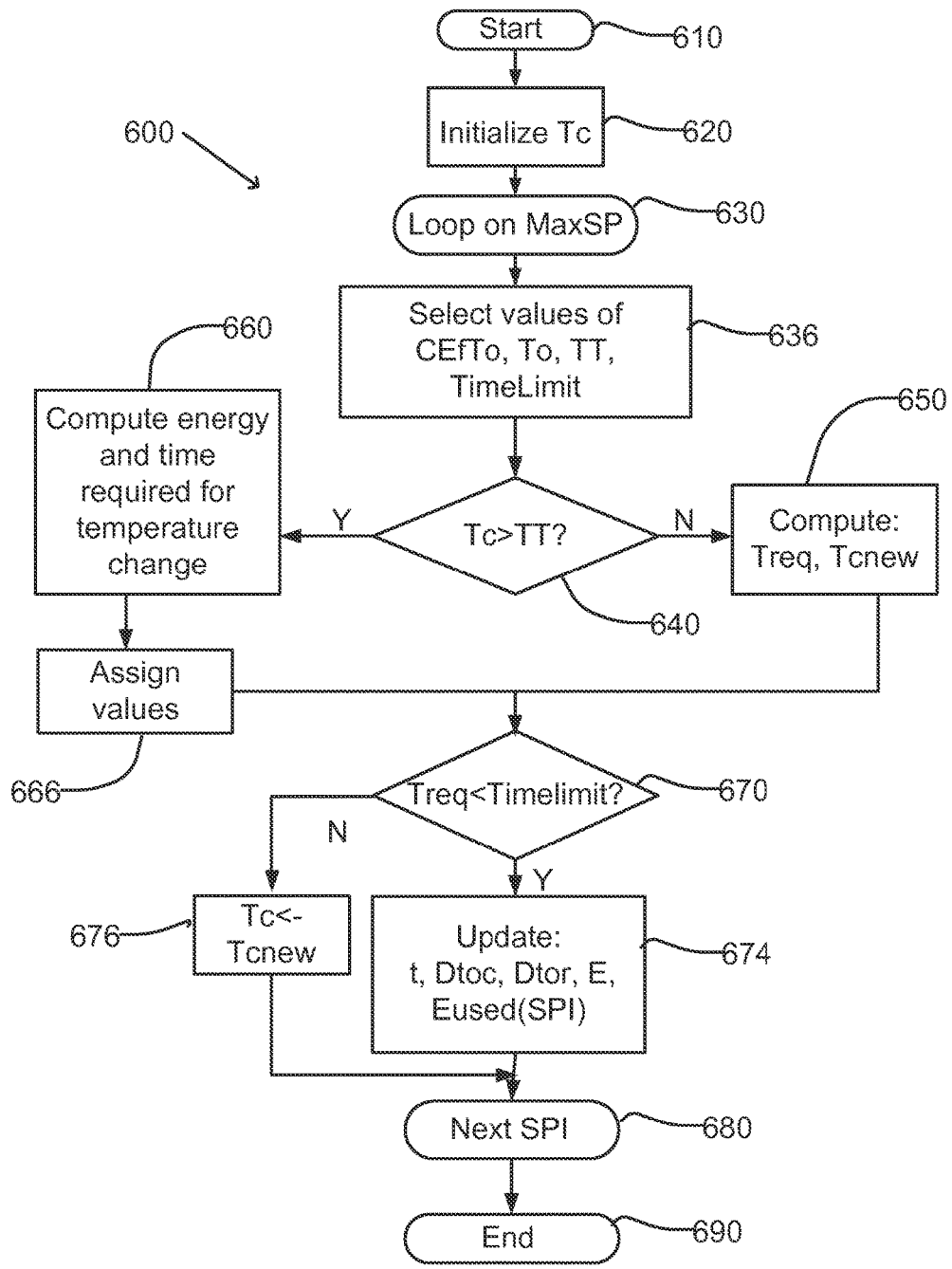
FIG. 6 is a flowchart for computing the required energy for achieving a set of chiller set points, in accordance with an embodiment of the present invention.

FIG. 6 is a flowchart for computing the required energy for achieving a set of chiller set points, in accordance with an embodiment of the present invention.

Energy computation method 600 may be executed by a suitable processor, e.g. a processor that is associated with an intelligence center, a control center, or a user console of a HVACS.

At the start of execution of energy computation method 600 (block 610), the following values are input:

TStrt—starting time for computed operation of the chiller. For example, if the computation is for a 24-hour day, Tstrt may be set to midnight.

TempSt—initial temperature of chiller fluid. For example, may be the last set point from a previous 24-hour period of chiller operation, or an estimate based on the outdoor temperature and chiller characteristics, e.g., after a period of time when the chiller was not operating.

MaxSP(SPI)—an array of set points array for all intervals SPI.

TInter—the length of each SPI interval, e.g., in seconds.

CefTo(SPI)—forecast of outdoor effective temperature for each interval SPI.

To(SPI)—forecast of outdoor temperature in shade per each interval SPI.

Tr—desired room temperature

CRP—rated power of chiller, e.g., in kW.

At the end of execution of energy computation method 600 (block 690), the following is output:

Eused(SPI)—energy used to reduce temperature from each MaxSP(SPI) to the following MaxSP(SPI+1).

Valid (SPI)—indication of validity (achievability) of transition from each MaxSP(SPI) to following MaxSP(SPI+1) during time allotted for SPI. For example, having a False value if transition failed (was not achievable). In the case of failure, MaxSP(SPI+1) is assigned the value of the lowest possible temperature achievable.

Values of MaxSP(SPI) may be modified during execution of energy computation method 600.

The chiller temperature Tc is initialized to Temp St (block 620).

The method then includes a loop of operations (blocks 630 through 680) that are performed for each interval SPI for which a value of MaxSP was provided, beginning at time Tstrt.

During each iteration of the loop, appropriate values for the SPI of the current iteration of the loop are selected from the input data (block 636). For example, appropriate values for that SPI of CefTo(SPI) and To(SPI) are selected for used in calculations. For each iteration, the target temperature TT is set equal to the appropriate value of MaxSP(SPI). The time limit (TimeLimit) for achieving TT is set equal to TInterv.

The current chiller temperature Tc is compared with TT (block 640).

As represented by block 650, if Tc is not greater than TT (such that the temperature is allowed to rise without expenditure of energy), the time required for Tc to rise to TT, Treq, is computed. The temperature to which the chiller fluid rises within the time period TimeLimit, Tcnew, is also computed.

As represented by block 660, if Tc is greater than TT (such that the chiller must expend energy to achieve a fluid temperature TT), the quantity of energy expended, EUfTR, and the time required, Treq, to reduce Tc to TT are calculated. The temperature to which the chiller fluid is cooled within the time period TimeLimit, Tcnew, is computed, as well as a value of Valid that indicates whether or not temperature TT is achievable within TimeLimit.

Output values are assigned (block 666) on the basis of the values computed in the operations that are represented in block 660. The appropriate value of Valid(SPI) is assigned the computed value Valid. The appropriate value of Eused (SPI) is assigned the computed value EUfTR. The appropriate value of Valid(SPI) is assigned the computed value Valid. The appropriate value of MaxSP(SPI) may be assigned the value of Tcnew (which may be different from TT).

Whether or not Tc was greater than TT, the time required for the temperature change, Treq, is compared with TimeLimit (block 670).

If Treq is less than TimeLimit, the energy E required to maintain temperature TT was achieved during the remainder of time period SPI is calculated (block 674). The calculation may be in accordance with Equation 1, where the parameters of Equation 1 are assigned values: t=TimeLimit−Treq, DToc=CefTo Tc, and Dtor=To−Tr. The value of Eused(SPI) is adjusted by adding the value of the calculated E.

If Treq is not less than TimeLimit, TT was not achieved and the current value of the chiller, Tc, is set equal to Tcnew (block 676).

The loop then continues for the next SPI (block 680).

At the end of execution of energy computation method 600 (block 690), output values of Eused(SPI), Valid(SPI), and a possibly modified array MaxSP(SPI) are output.

Figure 7:
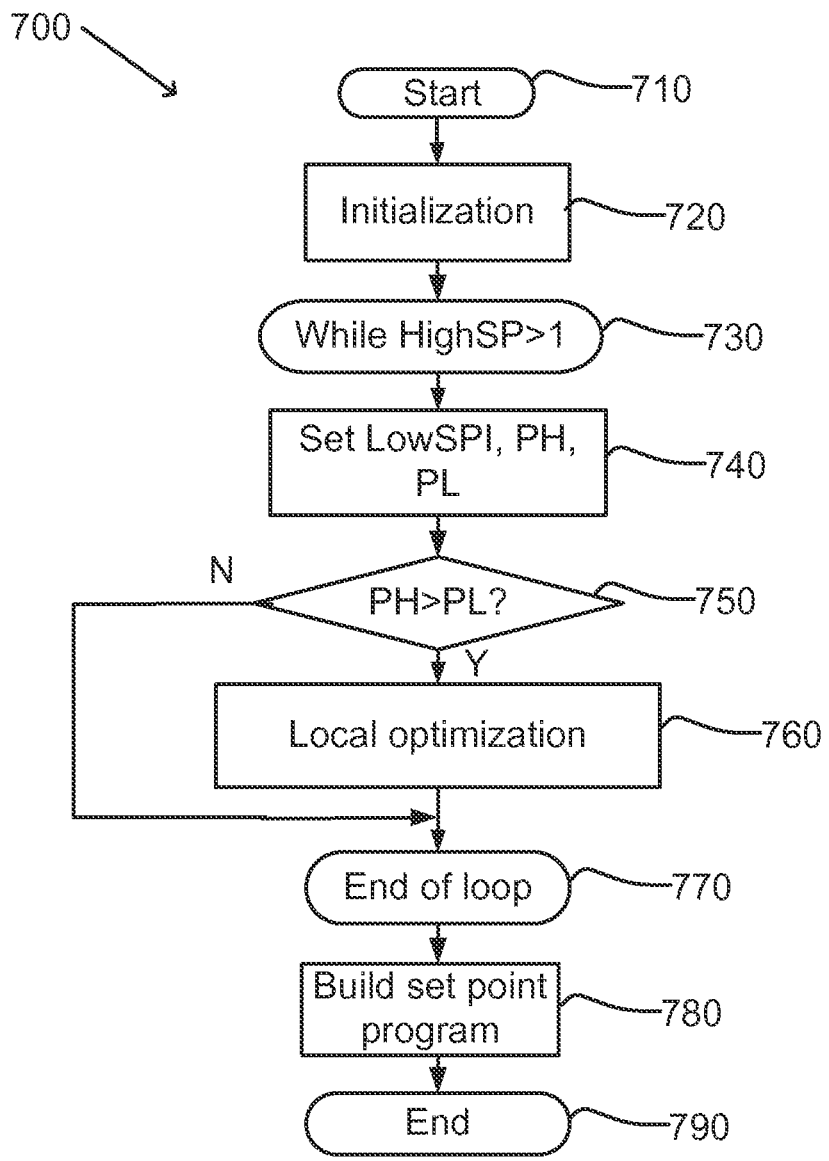
FIG. 7 is a flowchart of a method for cost optimization in operation of a chiller, in accordance with an embodiment of the present invention.

FIG. 7 is a flowchart of a method for cost optimization in operation of a chiller, in accordance with an embodiment of the present invention.

Cost optimization method 700 may be executed by a suitable processor, e.g. a processor that is associated with an intelligence center, a control center, or a user console of a HVACS. Cost optimization method 700 may be executed after execution of a method for determining the energy and time required to achieve a set of set points, such as energy computation method 600 illustrated in FIG. 6.

Execution of cost optimization method 700 may enable global cost optimization by transferring or shifting energy use from more expensive periods to less expensive periods. Energy shifting means lowering the water temperature when the energy is less expensive, and allowing the temperature to rise, without activating compressors, when the energy cost is high. Since energy use during one SPI may be transferred to an earlier period during which energy is less expensive (transferring to a later period would not enable achieving the desired water temperature), the method operates by beginning from the last SPI and working backward in time. Energy use during each SPI is examined, an SPI with lower energy costs is sought, and the possibility of reducing water temperature during that earlier period is evaluated. Since lowering the temperature during the earlier period may require increased expenditure of energy in order to maintain that lower temperature, since an increased temperature difference between the chiller and the outdoor temperature results in increased heat flow and an increased rate of temperature increase. Energy required to reduce a given chiller temperature Tc by temperature difference dT is calculated, and the cost of doing so is compared with any savings during more expensive periods.

At the start of execution of cost optimization method 700 (block 710), the following values are input:

LastInterval—an index indicating a latest SPI interval for which energy costs are to be optimized.

EPricesA (SPI)—an array containing energy prices for each SPI interval. The data may be obtained from a utility or ISO at resolution that is typically lower than resolution of energy usage calculations, e.g., price as a function of hour of day.

MaxSP(SPI)—an array of chiller set points for each SPI.

Eused(SPI)—energy utilized during each interval SPI.

Valid (SPI)—indication of achievability of a temperature change during each interval SPI.

Values of MaxSP(SPI), Eused(SPI), and Valid (SPI) may be obtained, for example, as a result of execution of a time and energy computation procedure, such as energy computation method 600.

At the end of execution of cost optimization method 700 (block 790), the following values may be output:

ProgSP(Interval)—an array of set points for a second plurality of time periods in acceptable resolution (as indicated by Interval) and calculated in accordance with characteristics of the chiller's performance.

Energy (Interval)—energy usage during each interval.

Ecost (Interval)—energy cost during each interval

After input of input data, values are initialized (block 720). Initialization includes initializing SPI index (indicating a candidate high energy cost period) HighSPI to LastInterval. In accordance with cost optimization method 700, starting with a current interval (HighSPI), a search is performed back to the beginning of the day for prices that are lower than in the current interval. Low SPI is an input for the local optimization procedure and determines from which interval to begin searching for low prices, the initial interval being HighSPI−1.

A loop over SPI (blocks 730 through 770) is executed while the condition HighSPI>1 (has not reached the earliest interval) is satisfied.

In each iteration of the loop, index LowSPI (for indicating a candidate low energy cost SPI that immediately precedes the SPI indicated by HighSPI) is assigned an initial value equal to one less than HighSPI, high price PH is assigned a value of EPricesA (HighSPI), and low price PL is assigned a value of EPricesA (LowSPI) (block 740).

PH is compared with PL to determine whether there is a change in energy cost between the SPI indicated by HighSPI and the previous SPI (block 750). If PH is not greater than PL, no possible energy cost savings are possible for this combination of SPI periods indicated by LowSPI and HighSPI, index HighSPL is decremented by one, and another iteration of the loop is executed (block 770).

If PH is greater than PL, a local cost optimization procedure (described below) is executed (block 760) to determine if any energy cost savings are attainable by shifting energy usage from the SPI indicated by HighSPI to the SPI indicated by LowSPI. Index HighSPL is decreased by one and another iteration of the loop is executed (block 770).

After execution of the loop is completed, a set point program may be constructed, as discussed below (block 780). The set point program defines a schedule of set points for optimized energy savings.

At the end of execution of cost optimization method 700 (block 790), the set point program, ProgSP(Interval), may be output.

Figure 8:
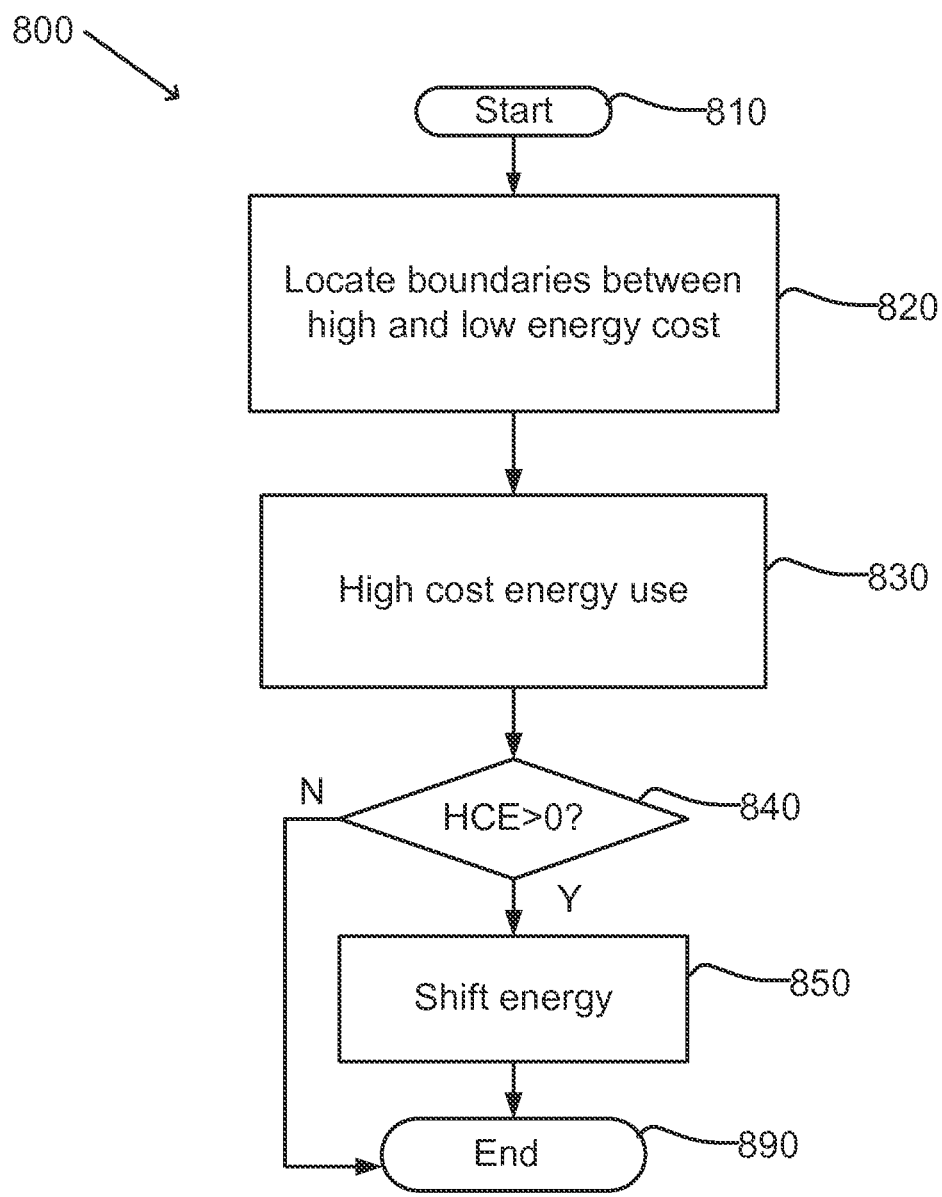
FIG. 8 is a flowchart of a method for local cost optimization in operation of a chiller, in accordance with an embodiment of the present invention.

FIG. 8 is a flowchart of a method for local cost optimization in operation of a chiller, in accordance with an embodiment of the present invention.

Local cost optimization method 800 may be executed by a suitable processor, e.g. a processor that is associated with an intelligence center, a control center, or a user console of a HVACS. Local cost optimization method 800 may be executed as part of execution of a global cost optimization method, such as cost optimization method 700 (block 760 of FIG. 7).

Local cost optimization method 800 performs cost optimization between two near intervals with different electricity prices.

At the start of execution of local cost optimization method 800 (block 810), the input includes values that were either input to or generated by cost optimization method 700 as described above: HighSPI, LowSPI, EPricesA(SPI), MaxSP (SPI), Eused(SPI), LastInterval, and Valid (SPI). In addition, input may include PECT(SPI), an array of potential energy-changing temperatures.

At the end of execution of local cost optimization method 800 (block 890), output may include:

ProgSP(Interval)—an array of set points in acceptable resolution (as indicated by Interval) and calculated in accordance with characteristics of the chiller's performance.

Energy (Interval)—energy usage per interval.

Ecost (Interval)—energy cost per interval.

A procedure may be executed to delineate periods of time with high and low energy costs (block 820). The procedure includes finding index HighSPIstart, which points to the SPI at the beginning of a time period having an energy tariff that is higher than in a previous period of time, and the index LowSPIend, which points to the SPI at the end of a period of time of low-cost energy.

The procedure for delineating time periods of high and low energy costs seeks the boundaries of the periods of time in which energy costs are high and low.

The input to the high and low price determination procedure includes EPricesA (SPI), HighSPI, LowSPI, and LastInterval (values input to or generated by a global cost optimization method, such as cost optimization method 700).

The output from the high and low price determination procedure defines boundaries of high-cost and low-cost time periods: HighSPIstart, pointing to the start of the high-priced energy time period, and LowSPIend, pointing to the end of the low-priced energy time period.

The high and low price determination procedure includes seeking a pointer to the start of the high-priced energy time period. Seeking the start pointer includes initially assigning the value of EPricesA (LowSPI) to a variable LowPrice and initializing index HighSPIstart to HighSPI. In each iteration of a loop while Price>LowPrice and HighSPIstart>0, the value of EPricesA (HighSPIstart) is assigned to Price and HighSPIstart is decremented by 1. The end of the loop signifies that either a price boundary was found or that no price boundary exists before HighSPI. After the loop, the value of HighSPIstart is incremented by 1.

The minimum price in the high-priced energy time period is then found by assigning to the variable MinHighPrice the minimum value of EPricesA (SPI) in the range of indices SPI from HighSPIstart to HighSPI.

The high and low price determination procedure includes seeking a pointer to the end of a low-priced energy time period. Seeking the end pointer includes initializing index LowSPIend to LowSPI. In each iteration of a loop while Price<MinHighPrice and LowSPIend≤LastInterval, the value of EPricesA (LowSPIend) is assigned to Price and LowSPIend is incremented by 1. The end of the loop signifies that either a price boundary was found or that no price boundary exists after LowSPI. After the loop, the value of LowSPIend is decremented by 1.

The values of HighSPIstart and LowSPIend are output by the high and low price determination procedure.

A procedure may be executed to calculate HCE (high-cost energy), the quantity of energy that is used during a time period of high energy costs (block 830). If the set point is increasing from SPI to SPI, it is possible that no energy is used during a time period of high-cost energy, and therefore no energy is available for shifting to a low-priced energy time period.

Input to the HCE calculation procedure includes Eused (SPI), HighSPI, and HighSPIstart (as calculated by the previously executed high and low price determination procedure).

Output by the HCE calculation procedure includes HCE. The value of HCE is calculated by summing Eused(SPI) in the interval of high-priced energy in the range delineated SPI from HighSPIstart to HighSPI.

If HCE is not greater than zero (no high-cost energy is used—block 840), the values of ProgSP(Interval), Energy (Interval), and Ecost (Interval) are output at the end of execution of local cost optimization method 800 (block 890).

If HCE is greater than zero (high-cost energy is used—block 840), a procedure, such as energy shift method 900 (FIG. 9 and defined below), may be executed to shift energy usage from the time period of high-cost energy to a time period of low-cost energy when such a shift would save energy costs (block 850). After performing the energy shift, the values of ProgSP(Interval), Energy (Interval), and Ecost (Interval) are output at the end of execution of local cost optimization method 800 (block 890).

Figure 9:
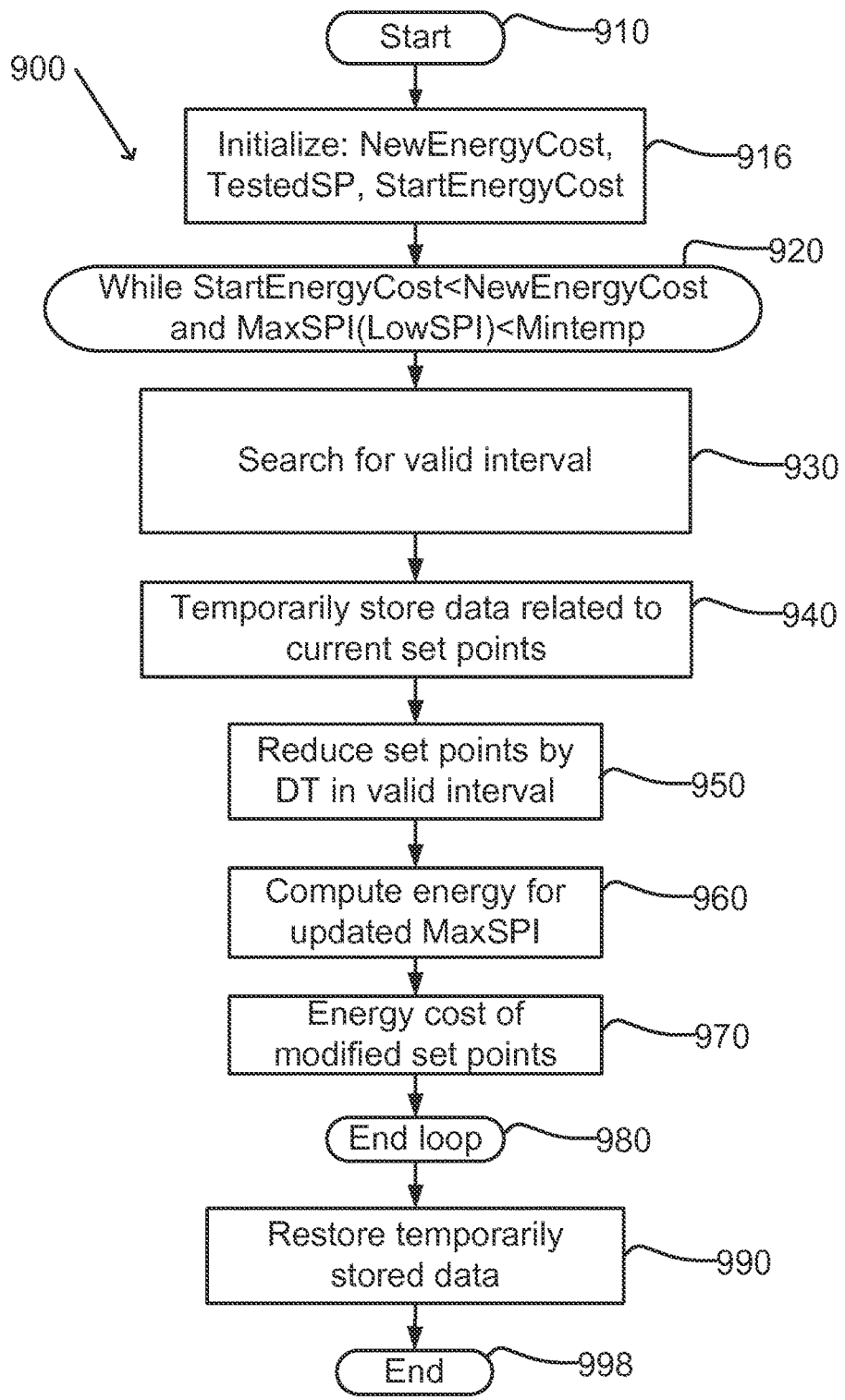
FIG. 9 is a flowchart of a method for energy shifting in operation of a chiller, in accordance with an embodiment of the present invention.

FIG. 9 is a flowchart of a method for energy shifting in operation of a chiller, in accordance with an embodiment of the present invention.

Energy shift method 900 may be executed by a suitable processor, e.g. a processor that is associated with an intelligence center, a control center, or a user console of a HVACS. Energy shift method 900 may be executed may be executed as part of execution of a local cost optimization method, such as local cost optimization method 800 (block 850 of FIG. 8).

Energy shift method 900 computes how much energy may be shifted from a delineated high-priced energy time period area to a delineated low-priced energy time period by decreasing the set point in the intervals of the low-priced energy time period. After each decrease, total cost of energy is evaluated to determine whether the total cost was reduced. If no reduction of total energy cost is found, the procedure returns the previously determined set points.

At the start of execution of energy shift method 900 (block 910), the input includes values that were either input to or generated by local cost optimization method 800 as described above: HighSPIstart, LowSPIend, LowSPI, EPricesA(SPI), MaxSP(SPI), Eused(SPI), and Valid (SPI). In addition, input may include Mintemp, specifying a minimum allowed temperature (e.g., based on considerations such as chiller operation or a freezing point of the chiller fluid), and DT, a temperature decrement value (e.g., 0.1° C.).

At the end of execution of energy shift method 900 (block 998), output may include MaxSPI(SPI), an array of chiller set points.

Execution of energy shift method 900 includes initializing values (block 916). Variable NewEnergyCost is initialized to zero, index TestedSPI is initialized to LowSPI, and StartEnergyCost is assigned a value equal to the sum over all periods SPI of the product of Eused(SPI)·EPricesA(SPI).

A loop over (blocks 920 through 980) is executed while the conditions StartEnergyCost<NewEnergyCost and MaxSPI(LowSPI)>Mintemp (energy costs are being reduced and the trial temperature is above the minimum temperature) are satisfied.

A valid interval is searched for (block 930), in with the first interval SPI in the having an index in the interval LowSPI to LowSPIend (low-priced energy time period) for which Valid (SPI) has a value True. Since the target temperature is achievable in that interval SPI, the index of which is assigned to TestedSPI, it is possible that a lower target temperature could also be achieved.

Current data is stored in temporary buffers for possible retrieval later on (block 940). The current set of set points, MaxSPI(SPI), is saved in temporary buffer TempMaxSPI. The energy used in accordance with the current set points MaxSPI, Eused(SPI), is stored in temporary buffer TempEusedSPI.

The set point values MaxSPI(SPI) in the interval from TestedSPI to LowSPI (in low-priced energy time period) are each modified by reducing the set point by (subtracting) DT (block 950).

The energy required to achieve each of the modified set points is computed (block 960). For example, a energy computation method such as iterative energy computation method 300 (FIG. 3) may be executed for the modified set points MaxSPI(SPI). The result is a new set of Eused(SPI) and Valid (SPI).

The energy cost for the modified set points, NewEnergyCost, may be calculated as the sum over all periods SPI of the product of Eused(SPI)·EPricesA(SPI) (block 970).

The loop ends (block 980) when the latest iteration fails to reduce energy costs, or the temperature reduction exceeds an allowed limit. Since the latest iteration had not produced desirable set points, the previous values of MaxSPI(SPI) and Eused(SPI) that had been temporarily stored previously (in the operation represented by block 940) are restored.

At the end of execution of energy shift method 900 (block 998), an array of possibly modified set points, MaxSPI(SPI), is output.

A build program procedure may be executed as part of execution of a global optimization method, such as cost optimization method 700 (block 780 of FIG. 7).

A build program procedure builds and outputs an array of set points ProgSP(OpInterval) in accordance with performance constraints of a specific chiller. The intervals specified by OpInterval are suitable for operation of the specific chiller and are longer than the intervals of SPI.

Inputs to the build program procedure include:

MaxSPI(SPI)—array of set points

TInterv—the interval length for MaxSPI(SPI), e.g., in units of seconds.

LastInterval—last SPI interval for MaxSPI(SPI).

SetPRes—set point resolution—minimal time for a set point change.

Execution of the build program procedure includes computing a number of SPI intervals to include in a single ProgSP interval OpInterval.

Variable NumberOfIntervals is set equal to SetPRes/TInterv. StartSPI is set equal to 1 and EndSPI is set equal to NumberOfIntervals. OpInterval is initialized to 1.

In a loop is executed while EndSPI<LastInterval: The operational set point for chiller for each operational interval OpInterval is calculated as a minimum of all of the set point values in the MaxSP array that are within the range of that OpInterval:

ProgSP(OpInterval) is set equal to the minimum value of MaxSP(Index) in the range of Index from StartSPI to EndSPI.

StartSPI is assigned the value EndSPI+1.

EndSPI is incremented by NumberOfIntervals.

(End of loop)

Learning methods enable a chiller control system to determine parameters for application of some or all of the calculations relating to energy usage that were described above.

A learning method may find or determine one or more of the following parameters, as described above:

Cco—a conductivity factor between elements of the chiller system and the outdoor ambient atmosphere.

Cro—a representative conductivity factor between rooms of the facility and outdoor ambient atmosphere.

Crc—a conductivity factor between the chiller system and a representative room. For example, the representative room may be the most problematic (e.g. the most difficult to cool or heat, or with the most extreme cooling or heating requirements) room in the facility. The factor Crc may include also a factor or contribution due to ventilation characteristics. The representative room may, for example, be a room for which an exceptionally low temperature is required, or a room with a high internal, external, or both internal and external energy flow IRE—an internal radiated energy flow within the representative room or the facility.

MaxRad—maximum solar irradiation when the sun is at its highest possible point during a year (e.g. local noon at summer solstice in temperate zones).

In general, these parameters may be obtained by a calculation that includes iterative solution of thermodynamic equations. These equations should be solved for a specific facility using the data collected from chillers and environmental sensors (e.g., thermometers, humidity gauges, wind gauges) and with various values of the chiller's set point. Equations to be solved may include a variation of Equation 2 for calculating the energy E required to maintain a constant chiller temperature Tc:

$$E = t \cdot ((CEfTo-Tc)^2 \cdot Cco + (CEfTo-Tc) \cdot (DTo \cdot Cro + IRE))/Tc^{Ex}).$$

Where CEfto, the chiller effective temperature may be written as, as above:

$$CefTo(H) = To(H) + A \cdot B \cdot \text{MaxRad} \cdot CL$$

where H is an hour of the day, and the factors A and B are defined as above.

Equations to be solved may also include an equation for energy flow inside the room from outdoors and internal energy sources:

$$Efor = (To-Tr) \cdot Cro + IRE.$$

This latter equation may be solved for local IRE and Cro, as described below, on the basis of measured values of To, and Tr with respect to specific examined rooms or zones within the facility. The results may be extrapolated to other sections of the facility, or to the facility as a whole, on the basis of the volumes of the examined rooms and the volume of the whole facility (or other section of the facility). IRE may vary during the day. Therefore, the values of IRE may be obtained as a function of time of day and day of the week. For example, the value of IRE may be expected to vary from hour to hour (and from day to day). However, during a short period of time, such as a few minutes, IRE may be assumed to remain constant. We also may assume To as constant during a short period of time. For example, the values of To and Tr may be measured once per minute. In seeking a solution to the equation, it may be observed whether To>Tr and Tr is increasing during the course of the measurement. If so, it may be inferred that the air conditioning is not significantly influencing room temperature during that period and any change in Tr over time is caused by the energy flow from outside and IRE alone.

During a short period of time, dt, the change in room temperature $Tr_{n+1} - Tr_n$, where n is an index to a temperature measurement, may be assumed to result from an average energy flow $Efor_{AV} = (To - Tr_{AVn}) \cdot Cro + IRE$ where $Tr_{AVn} = (Tr_{n+1} + Tr_n)/2$. Defining $An = Tr_{n+1} - Tr_n$ and $Bn = To - Tr_{AVn}$, equations based on four room temperature measurements (n=1, 2, 3, 4) may be solved as follows (RTM being the thermal mass of the room; $Efor_n = An \cdot RTM$):

$$A1 = (B1 \cdot Cro + IRE) \cdot dt/RTM$$

$$A2 = (B2 \cdot Cro + IRE) \cdot dt/RTM$$

$$A3 = (B3 \cdot Cro + IRE) \cdot dt/RTM$$

From the equations for A1 and A2:

$$A1 - A2 = dt(B1 - B2)Cro/RTM,$$

which may be rearranged as: $Cro/RTM = (A1-A2)/(dt \cdot (B1-B2))$, yielding a ratio between a room-to-outdoors conductivity factor and the room thermal mass.

The equation for A3 may be rearranged as:

$$A3/dt = B3 Cro/RTM + IRE/RTM \text{ or as:}$$

$$IRE/RTM = A3/dt - B3 \cdot Cro/RTM$$

yielding a ratio between the internally radiated energy and the room thermal mass in terms of Cro/RTM.

In order to obtain accurate values of the ratios Cro/RTM and IRE/RTM, sets of measurements should be repeated several times and averaged (or by applying a least squares fit, or similar technique). Since RTM is mainly a function of the room volume and also depends on humidity, repeated measurements should be made when the humidity in the room is approximately the same. A stable result is considered to have been obtained when subsequent measurements do not significantly affect the result. IRE may be computed for each hour of the day and day of the week. In order to obtain values of Cro and IRE, RTM must be known. As stated above, RTM depends on humidity. For example, for a relative humidity around 50%, typically considered a desirable humidity for a room that is intended for human occupancy, and a room temperature of around 20° C., the specific heat capacity for a volume of 1 m³ is about 1.2 kJ/° C. Thus, the heat capacity in units of kJ/° C. for a room with volume Vol m³ may be estimated as 1.2·Vol and the formulas for Cro and IRE may be written as:

$$Cro = (A1 - A2)/(dt \cdot (B1 - B2)) \cdot Vol \cdot 1.2 \text{ and}$$

$$IRE = A3/dt - B3 \cdot Cro.$$

The combination of Cco, Cro, and IRE may be calculated on the basis of measured energy usage.

Assuming t=1 hour, the energy $E_h$ that was consumed during hour h may be measured. Equation 1 may be rewritten in a shorter form as follows:

$$E_h = (DToc_h^2 \cdot Cco + DToc_h \cdot DTor_h \cdot Cro + IRE_h)/Tc'$$

$DToc_h$ is an average difference, CEfTo−Tc, between the effective outdoor temperature and the chiller water temperature as measured during hour h.

$DTor_h$ is an average difference, To−Tr, between the outdoor temperature and water temperature as measured during hour h.

$Tc' = Tc^{Ex}$. For a basic set point that is normally used for the facility, $Tc' = Tc$.

$IRE_h$ is the internal energy radiated during hour h.

Therefore, for each hour h, the equation for $E_h$ may be rearranged as:

$$Cco = E_h \cdot Tc'/DToc_h^2 - DTor_h \cdot Cro/DToc_h - IRE_h/DToc_h^2.$$

Past experience has shown, however, that in many systems, the first term of the equation for Cco dominates the equation, such that Cco may be well approximated by $Cco \approx E_h \cdot Tc'/DToc_h^2$.

To improve the estimate, it may be assumed that during normal business hours, all values of $IRE_h$ are similar and are approximately equal to IRE, which may be determined as described above. Thus, for a basic set point, Cco may be determined. However, accuracy of the calculation may be increased by performing multiple measurements:

$$E_1 = (Dtoc_1^2 Cco + Dtoc_1 \cdot Dtor_1 \cdot Cro + IRE)/Tc$$

$$E_2 = (Dtoc_2^2 \cdot Cco + Dtoc_2 \cdot Dtor_2 \cdot Cro + IRE)/Tc$$

$$E_3 = (Dtoc_3^2 \cdot Cco + Dtoc_3 \cdot Dtor_3 \cdot Cro + IRE)/Tc$$

Alternatively, the following three linear equations with three unknowns, Cco, Cro and IRE, may be solved by application of known methods:

$$E_1 * Tc = Dtoc_1^2 \cdot Cco + Dtoc_1 \cdot Dtor_1 \cdot Cro + IRE$$

$$E_2 * Tc = Dtoc_2^2 \cdot Cco + Dtoc_2 \cdot Dtor_2 \cdot Cro + IRE$$

$$E_3 * Tc = Dtoc_3^2 \cdot Cco + Dtoc_3 \cdot Dtor_3 \cdot Cro + IRE$$

A typical facility or HVACS has a built-in or added thermal storage capacity. The thermal storage capacity may be expressed as a time that is required to raise the chiller's water temperature by 1° C. as a function of the current set point and the outdoor temperature. This time also depends on the ambient temperature and the relative humidity in the vicinity of the chiller. Therefore, a chiller control system may maintain records of these variables. Knowing the thermal storage capacity may enable planning of energy usage during peak hours, when energy prices are highest. Prior to the peak hour, the chiller control system may reduce the chiller water temperature to a minimum, e.g., close to 0° C. The chiller water temperature may be allowed to increase to, for example, 12° C. If, in this example, the average time for each 1° C. increase is known to be 5 minutes, then the chiller need not work for the entire peak hour. Thus, no energy need by consumed when the price of energy is most expensive. The system may automatically learn and record these thermal storage features as a function of ambient temperature and relative humidity.

A plurality of chiller control systems may be integrated by a system that applies Automatic Demand Adaptation (ADA). ADA synchronizes changes in energy usage among the chillers so as to achieve efficient reduction of energy demand in a service area of an electrical power utility. Such synchronization may enable increasing efficiency of electrical power production by the utility.

Direct solar irradiation may significantly increase the effective outdoor temperature, as described above, thus affecting energy usage. Direct solar irradiation may increase the effective outdoor temperature by more than 70% in comparison to the effective outdoor temperature in the shade. Thus, shading the chiller in the summer, while exposing the chiller to direct solar irradiation in the winter, may enable significant energy savings.

The invention claimed is:

1. A method comprising:
   predicting, by a controller, a quantity of energy used by a chiller, based on a predicted flow of heat into one or more rooms in a building, to maintain a desired temperature of the one or more rooms in the building during each of a plurality of time periods of a chilling cycle; and
   automatically adjusting, by the controller, a set point of the chiller during the chilling cycle based on the predicted quantity of energy,
   wherein the predicted flow of heat is calculated using a predicted condition.

2. The method of claim 1, wherein the predicted condition is selected from a list of conditions consisting of temperature, humidity, solar irradiance, and internal radiated energy.

3. The method of claim 1, wherein predicting the quantity of energy comprises determining a thermal characteristic using a measured temperature received from environmental sensors, a measured temperature of the chiller fluid, a measured temperature of the one or more rooms in the building, and an outdoor temperature.

4. The method of claim 3, wherein determining the thermal characteristic further comprises using a measured energy use by the chiller.

5. The method of claim 3, wherein the thermal characteristic comprises at least one of: internally radiated energy, room-to-outdoors conductivity factor, and the one or more rooms' thermal mass.

6. The method of claim 1, wherein predicting the quantity of energy comprises calculating the set point of the chiller for a time period of said plurality of time periods to maintain the temperature of the one or more rooms in the building at the desired temperature during that time period.

7. The method of claim 6, wherein adjusting the set point comprises determining whether a length of that time period changes a temperature of a chiller fluid to the calculated set point of the chiller.

8. The method of claim 7, wherein adjusting the set point comprises adjusting the set point to a chiller fluid temperature that is achievable during that time period when it is determined that during the length of that time period the chiller fluid temperature will not change to the calculated set point.

9. The method of claim 1, wherein adjusting the set point comprises changing the set point for a first interval of the chilling cycle so as to increase energy consumption during the first interval while reducing energy consumption during a second interval of the chilling cycle.

10. The method of claim 1, further comprising calculating a cost of the calculated quantity of energy used by a chiller, wherein adjusting the set point comprises reducing a total cost of the quantity of energy over the course of the chilling period.

11. The method of claim 10,
wherein a unit price of the quantity of energy is less expensive during a first interval of the chilling cycle than during a second interval of the chilling cycle, and
wherein adjusting the set point comprises changing the set point during the first interval or during the second interval to increase energy consumption during the first interval while decreasing energy consumption during the second interval.

12. The method of claim 1:
wherein automatically adjusting, by the controller, the set point of the chiller for the plurality of time intervals of the chilling cycle is such that the quantity of energy predicted to be used by the chiller conforms to a predetermined criterion.

13. The method of claim 12,
wherein predicting the quantity of energy comprises calculating the set point of the chiller for a time period of said plurality of time periods to maintain the temperature of the one or more rooms in the building at the desired temperature during that time period,
wherein the predetermined criterion comprises availability during that time period to change a temperature of a chiller fluid to the calculated chiller set point during that time period, and
wherein adjusting the set point comprises adjusting the set point to a temperature that is achievable during that time period upon a determination that sufficient time is not available during that time period.

14. The method of claim 12,
wherein a unit price of the quantity of energy used by a chiller is less expensive during a first interval of said plurality of time intervals than during a second interval of said plurality of time intervals,
wherein the predetermined criterion comprises minimizing a total cost of the consumed energy over the course of the chilling period, and
wherein adjusting the set point comprises changing the set point for the first interval or for the second interval so as to increase energy use by the chiller during the first interval and decrease energy use by the chiller during the second interval.

\* \* \* \* \*